(12) United States Patent
Kojima et al.

(10) Patent No.: US 7,061,522 B1
(45) Date of Patent: Jun. 13, 2006

(54) OPTICAL FIBER FUSION-SPLICER

(75) Inventors: Hidekazu Kojima, Tokyo (JP); Seiryo Mishima, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/423,461

(22) PCT Filed: Feb. 3, 1999

(86) PCT No.: PCT/JP99/00445

§ 371 (c)(1),
(2), (4) Date: Nov. 30, 1999

(87) PCT Pub. No.: WO99/47903

PCT Pub. Date: Sep. 23, 1999

(30) Foreign Application Priority Data

Mar. 18, 1998 (JP) ................................ 10-068596

(51) Int. Cl.
*H04N 7/18* (2006.01)
(52) U.S. Cl. ........................... 348/61; 348/64; 348/47; 348/95; 348/94; 348/93; 348/87; 348/92; 385/98; 385/96; 385/97
(58) Field of Classification Search ................ 348/61, 348/64, 92, 95, 125, 47, 86, 87, 180, 94, 348/93; 385/96, 95, 97, 98; 356/636; 600/166
See application file for complete search history.

(56) References Cited

U.S. PATENT DOCUMENTS

| | | | | |
|---|---|---|---|---|
| 4,523,226 A | * | 6/1985 | Lipton et al. | 348/49 |
| 4,772,945 A | * | 9/1988 | Tagawa et al. | 348/155 |
| 5,111,323 A | * | 5/1992 | Tanaka et al. | 398/52 |
| 5,191,393 A | * | 3/1993 | Hignette et al. | 356/636 |
| 5,522,789 A | * | 6/1996 | Takahashi | 600/166 |
| 6,034,718 A | * | 3/2000 | Hattori | 348/61 |
| 6,287,020 B1 | * | 9/2001 | Osaka et al. | 385/96 |

FOREIGN PATENT DOCUMENTS

JP  A-8-340473  12/1996

\* cited by examiner

*Primary Examiner*—Shawn S. An
(74) *Attorney, Agent, or Firm*—Oliff & Berridge, PLC

(57) ABSTRACT

In an optical fiber observing image processing apparatus, at least two different capturing modes is provided in an image capturing means for capturing image data from two or more television cameras, so that, by automatically switching capturing modes in synchronous with or independently from progress of the image processing, high speed processing can be achieved regardless of limitation of a data capturing speed. A scanning converting means is provided in a rear stage of the image capturing means, and a plurality of different transfer modes for transferring data between the scanning converting means and the image capturing means are prepared. Further, a delay means may be provided in a front stage of the scanning converting means.

3 Claims, 30 Drawing Sheets

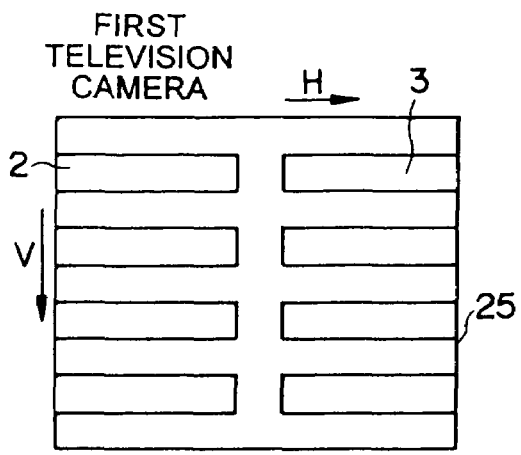
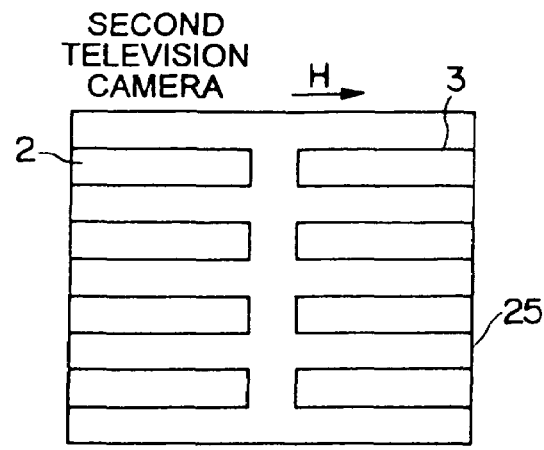
FIG. 11A   FIG. 11B
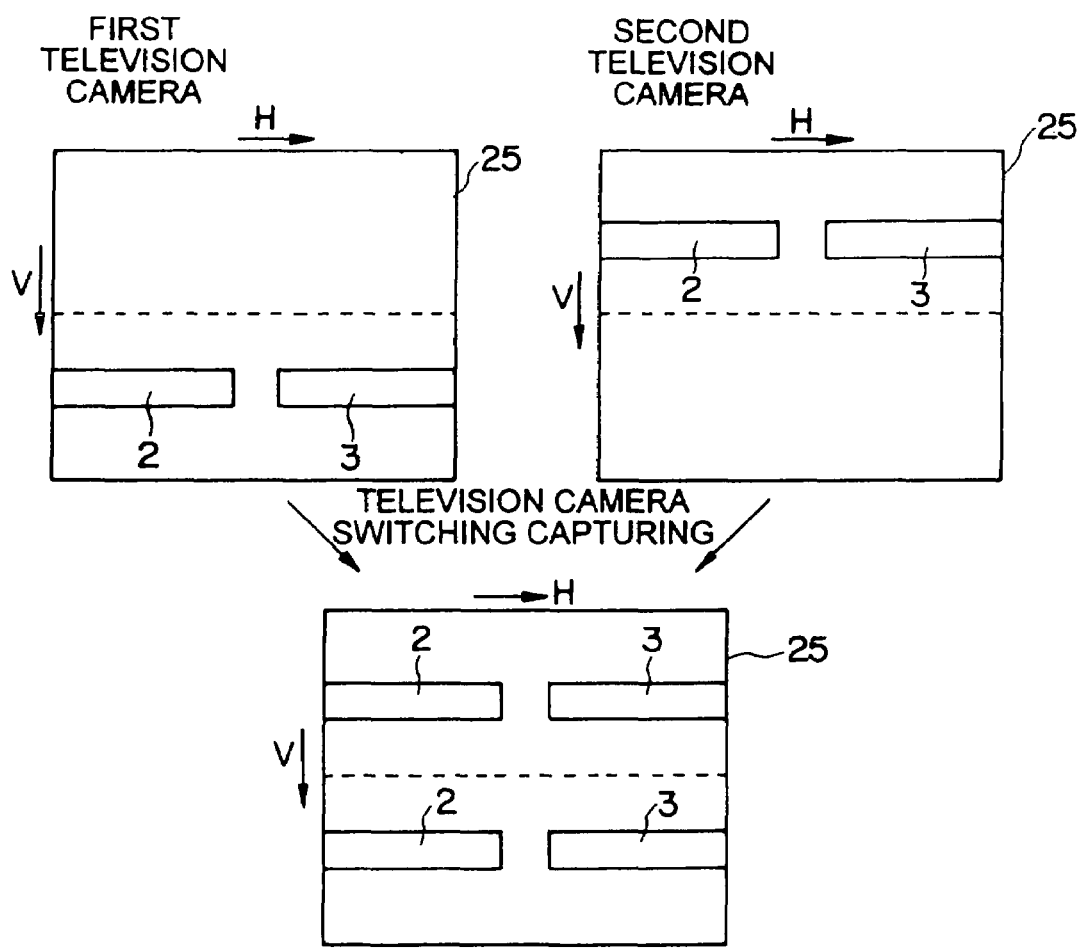
FIG. 12

OPTICAL FIBER FUSION-SPLICER

BACKGROUND OF THE INVENTION

1. Field of the Invention

The present invention relates to an optical fiber observing image processing apparatus in which an optical fiber set in an optical fiber fusion-splicer is photo-taken by a television camera and a photo-taken image is processed to permit automatic fusion-splice of the optical fiber. In this optical fiber observing image processing apparatus, a high speed processing speed is achieved and a circuit is simple while permitting high accurate observation with two or more television cameras.

2. Description of the Related Art

FIG. 30 shows an example of a conventional optical fiber fusion-splicer having an optical fiber observing image processing apparatus S. The optical fiber observing image processing apparatus S is devised so that connection of an optical fiber can be achieved at a high speed. The optical fiber fusion-splicer includes positioning members A, B shiftable in X-axis, Y-axis and Z-axis directions, and optical fibers (optical fiber core) C, D having ends to be butted are set in the positioning members. A television camera (camera head) G to which an incident optical system F is attached is disposed in the vicinity of butted portions of the optical fibers C, D and serves to photo-take images of the optical fibers C, D illuminated by an illumination light source E from a direction perpendicular to an optical axes of the fibers. An image photo-taken by the television camera G is processed by the fiber observing image processing apparatus S which will be described later. On the basis of a processed result, a signal is sent from the image processing apparatus S to a control circuit I and a fiber position control circuit J, so that the positioning members A, B are shifted on the basis of the signal to position the optical fibers C, D, the fibers C, D are fusion-connected by discharging between electrode rods H. The fiber observing image processing apparatus S has a function for confirming a condition of end faces of the fibers, as well as a function for controlling the positioning of the fibers C, D.

The fiber observing image processing apparatus S has a drive circuit K for supplying a synchronous signal and an electric power to the television camera G and for picking-up an image signal from the television camera G. In a rear stage of the drive circuit K, there are provided, in two systems, a capturing portion L for capturing the image signal outputted from the drive circuit K, a data memory M for storing the capturing image data, and a data operator (calculator) N for processing the image data to calculate information for the positioning of the fibers C, D. In one of the systems, a region where the fiber C is reflected is image-processed, and, in the other system, a region where the fiber D is reflected is image-processed, thereby increasing the entire image processing speed.

In some optical fiber fusion-splicer, three-dimensional positioning is facilitated by photo-taking optical fibers C, D (to be fusion-connected) from two or three directions. In the apparatus in which the fibers are photo-taken from two directions, as shown in FIG. 31A, a mirror R is disposed around the fibers C, D so that the fibers can be photo-taken by a single television camera from two directions simultaneously, or, as shown in FIG. 31B, two television cameras are provided so that the fibers C, D can be photo-taken from different angles. In the latter case, as shown in FIG. 32A, each television camera G is associated with an A/D converter T and a data memory U so that image signals of the television cameras G are captured in parallel to be processed by a data operator P, or, as shown in FIG. 32B, a video switcher V is provided so that the image signals are alternately captured by a single set of an A/D converter T and a data memory U while alternately switching two television cameras G to be processed by a data operator P. In the example shown in FIG. 32B, since a reflection of the television camera G is constituted by a frame image renewed every 1/30 second, two television cameras G are alternately switched by the video switcher V every 1/30 second, so that the image data are captured in the data memory U and the image processing is effected by the data operator P for each of the television cameras G every 1/15 second.

(1) Since the fiber observing image processing apparatus shown in FIG. 30 has only a single television camera G, it is not suitable for high accurate positioning. Further, due to recent high speed tendency of microprocessors (data operator N), high speed and larger capacity tendency of memories, a data transfer speed and a data calculating speed are increased greatly, even when a single television camera is used, it is not required that the image data is divided into two systems to process the data.

(2) In the fiber observing image processing apparatus shown in FIG. 31A since two images are photo-taken by the single television camera G, a magnifying power in the optical system cannot be increased, with the result that a resolving power is low in comparison with other photo-taking methods.

(3) In the fiber observing image processing apparatus shown in FIG. 32A, since the optical fibers C, D are photo-taken by two television cameras from plural directions, the positioning accuracy can be improved, and, since the image data from the television cameras G are captured independently to process the data, the processing speed can be increased. However, the circuit is complicated to make the entire apparatus expensive and bulky.

(4) In the fiber observing image processing apparatus shown in FIG. 32B, since the signals from two television cameras G are captured into the single capturing system to process the signals, the circuit can be simplified. However, since the images from the respective television cameras G are renewed every 1/15 second, it is difficult to increase the positioning speed.

SUMMARY OF THE INVENTION

An object of the present invention is to realize a fiber observing image processing apparatus in which image processing with a high resolving power can be effected by using two or more television cameras and image signals from these television cameras can be processed at a high speed, and a circuit can be simplified.

According to a first aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing.

According to a second aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel.

According to a third aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing means has a capturing mode in which a field of the respective television camera is divided into two or more so that the desired television camera is assigned to the respective divided field to capture the image data of the plural television cameras into one field in a multiplexing form.

According to a fourth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel and has a capturing mode in which a field of the respective television camera is divided into two or more so that the desired television camera is assigned to the respective divided field to capture the image data of the plural television cameras into one field in a multiplexing form.

According to a fifth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing means has a capturing mode in which one scanning line of the respective television camera is divided into two or more so that the desired television camera is assigned to the respective divided scanning line to capture the image data of the plural television cameras onto one scanning line in a multiplexing form.

According to a sixth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel and has a capturing mode in which one scanning line of the respective television camera is divided into two or more so that the desired television camera is assigned to the respective divided scanning line to capture the image data of the plural television cameras onto one scanning line in a multiplexing form.

According to a seventh aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and wherein the image data captured by the image capturing means can be outputted onto a television monitor and the like through a scanning converting means.

According to an eighth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel, and wherein the image data captured by the image capturing means can be outputted onto a television monitor and the like through a scanning converting means.

According to a ninth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing means has a capturing mode in which a field of the respective television camera is divided into two or more so that the desired television camera is assigned to the respective divided field to capture the image data of the plural television cameras into one field in a multiplexing form, and wherein the image data captured by the image capturing means can be outputted onto a television monitor and the like through a scanning converting means.

According to a tenth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel and has a capturing mode in which a field of the respective television camera is divided into two or more so that the desired television camera is assigned to the respective divided field to capture the image data of the plural television cameras into one field in a multiplexing form, and wherein the image data captured by the image capturing means can be outputted onto a television monitor and the like through a scanning converting means.

According to an eleventh aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing means has a capturing mode in which one scanning line of the respective television camera is divided into two or more so that the desired television camera is assigned to the respective divided scanning line to capture the image data of the plural television cameras onto one scanning line in a multiplexing form, and wherein the image data captured by the image capturing means can be outputted onto a television monitor and the like through a scanning converting means.

According to a twelfth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel and has a capturing mode in which one scanning line of the respective television camera is divided into two or more so that the desired television camera is assigned to the respective divided scanning line to capture the image data of the plural television cameras onto one scanning line in a multiplexing form, and wherein the image data captured by the image capturing means can be outputted onto a television monitor and the like through a scanning converting means.

According to a thirteenth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and wherein the image data capturing by the image capturing means can be outputted onto a television monitor and the like through a scanning converting means, and at least two different transfer modes are provided for transferring of the image data between the image capturing means and the scanning converting means.

According to a fourteenth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel, and wherein the image data captured by the image capturing means can be outputted onto a television monitor and the like through a scanning converting means, and at least two different transfer modes are provided for transferring of the image data between the image capturing means and the scanning converting means.

According to a fifteenth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing means has a capturing mode in which a field of the respective television camera is divided into two or more so that the desired television camera is assigned to the respective divided field to capture the image data of the plural television cameras into one field in a multiplexing form, and wherein the image data captured by the image capturing means can be outputted onto a television monitor and the like through a scanning converting means, and at least two different transfer modes are provided for transferring of the image data between the image capturing means and the scanning converting means.

According to a sixteenth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel and has a capturing mode in which a field of the respective television camera is divided into two or more so that the desired television camera is assigned to the respective divided field to capture the image data of the plural television cameras into one field in a multiplexing form, and wherein the image data captured by the image capturing means can be outputted onto a television monitor and the like through a scanning converting means, and at least two different transfer modes are provided for transferring of the image data between the image capturing means and the scanning converting means.

According to a seventeenth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing means has a capturing mode in which one scanning line of the respective television camera is divided into two or more so that the desired television camera is assigned to the respective divided scanning line to capture the image data of the plural television cameras onto one scanning line in a multiplexing form, and wherein the image data captured by the image capturing means can be outputted onto a television monitor and the like through a scanning converting means, and at least two different transfer modes are provided for transferring of the image data between the image capturing means and the scanning converting means.

According to an eighteenth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel and has a capturing mode in which one scanning line of the respective television camera is divided into two or more so that the desired television camera is assigned to the respective divided scanning line to capture the image data of the plural television cameras onto one scanning line in a multiplexing form, and wherein the image data captured by the image capturing means can be outputted onto a television monitor and the like through a scanning converting means, and at least two different transfer modes are provided for transferring of the image data between the image capturing means and the scanning converting means.

According to a nineteenth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and wherein the image data captured by the image capturing means can be outputted onto a television monitor and the like through a scanning converting means, and at least two different transfer modes are provided for transferring of the image data between the image capturing means and the scanning converting means, and the transfer modes can automatically be switched in synchronous with or independently from the progress of the image processing.

According to a twentieth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel, and wherein the image data captured by the image capturing means can be outputted onto a television monitor and the like through a scanning converting means, and at least two different transfer modes are provided for transferring of the image data between the image capturing means and the scanning converting means, and the transfer modes can automatically be switched in synchronous with or independently from the progress of the image processing.

According to a twenty-first aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the image capturing means has a capturing mode in which a field of the respective television camera is divided into two or more so that the desired television camera is assigned to the respective divided field to capture the image data of the plural television cameras into one field in a multiplexing form, and wherein the image data captured by the image capturing means can be outputted onto a television monitor and the like through a scanning converting means, and at least two different transfer modes are provided for transferring of the image data between the image capturing means and the scanning converting means, and the transfer modes can automatically be switched in synchronous with or independently from the progress of the image processing.

According to a twenty-second aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel and has a capturing mode in which a field of the respective television camera is divided into two or more so that the desired television camera is assigned to the respective divided field to capture the image data of the plural television cameras into one field in a multiplexing form, and wherein the image data captured by the image capturing means can be outputted onto a television monitor and the like through a scanning converting means, and at least two different transfer modes are provided for transferring of the image data between the image capturing means and the scanning converting means, and the transfer modes can automatically be switched in synchronous with or independently from the progress of the image processing.

According to a twenty-third aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the image capturing means has a capturing mode in which one scanning line of the respective television camera is divided into two or more so that the desired television camera is assigned to the respective divided scanning line to capture the image data of the plural television cameras onto one scanning line in a multiplexing form, and wherein the image data captured by the image capturing means can be outputted onto a television monitor and the like through a scanning converting means, and at least two different transfer modes are provided for transferring of the image data between the image capturing means and the scanning converting means, and the transfer modes can automatically be switched in synchronous with or independently from the progress of the image processing.

According to a twenty-fourth aspect of the present invention, there is provided an optical fiber observing image processing apparatus in which positioning of optical axes and end faces of optical fibers can be automatically controlled by capturing and processing image data of the optical fibers photo-taken by television cameras, wherein the apparatus includes an image capturing means capable of capturing image data from two or more television cameras and capable of capturing and image-processing only desired image data from each of the television cameras, and the image capturing means has two or more different capturing modes regarding the capturing of the image data, and the capturing modes can automatically be switched in synchronous with or independently from the progress of the image processing, and the capturing modes of the image capturing means include at least two of a capturing mode in which the image data can be captured from the television cameras from frame to frame and the image data can be captured from the television cameras by successively switching the television cameras from frame to frame, a capturing mode in which the image data can be captured from the television cameras from field to field and the image data can be captured from the television cameras by successively switching the television cameras from field to field and a capturing mode in which the image data can be captured from the television cameras from pixel to pixel and the image data can be captured from the television cameras by successively switching the television cameras from pixel to pixel and has a capturing mode in which one scanning line of the respective television camera is divided into two or more so that the desired television camera is assigned to the respective divided scanning line to capture the image data of the plural television cameras onto one scanning line in a multiplexing form, and wherein the image data capturing by the image capturing means can be outputted onto a television monitor and the like through a scanning converting means, and at least two different transfer modes are provided for transferring of the image data between the image capturing means and the scanning converting means, and the transfer modes can automatically be switched in synchronous with or independently from the progress of the image processing.

According to a twenty-fifth aspect of the present invention, a delay means capable of setting a desired delay time is provided in the optical fiber observing image processing apparatus according to any one of first to twenty-fourth aspects.

BRIEF DESCRIPTION OF THE DRAWINGS

FIG. 11A is a view showing an image of ribbon fiber photo-taken by a first television camera, and FIG. 11B is a view showing an image of ribbon fiber photo-taken by a second television camera;

FIG. 12 is an explanatory view showing an example of image capturing in the capturing mode ⑥;

BEST MODES FOR CARRYING OUT THE INVENTION

FIRST EMBODIMENT

Figure 1:
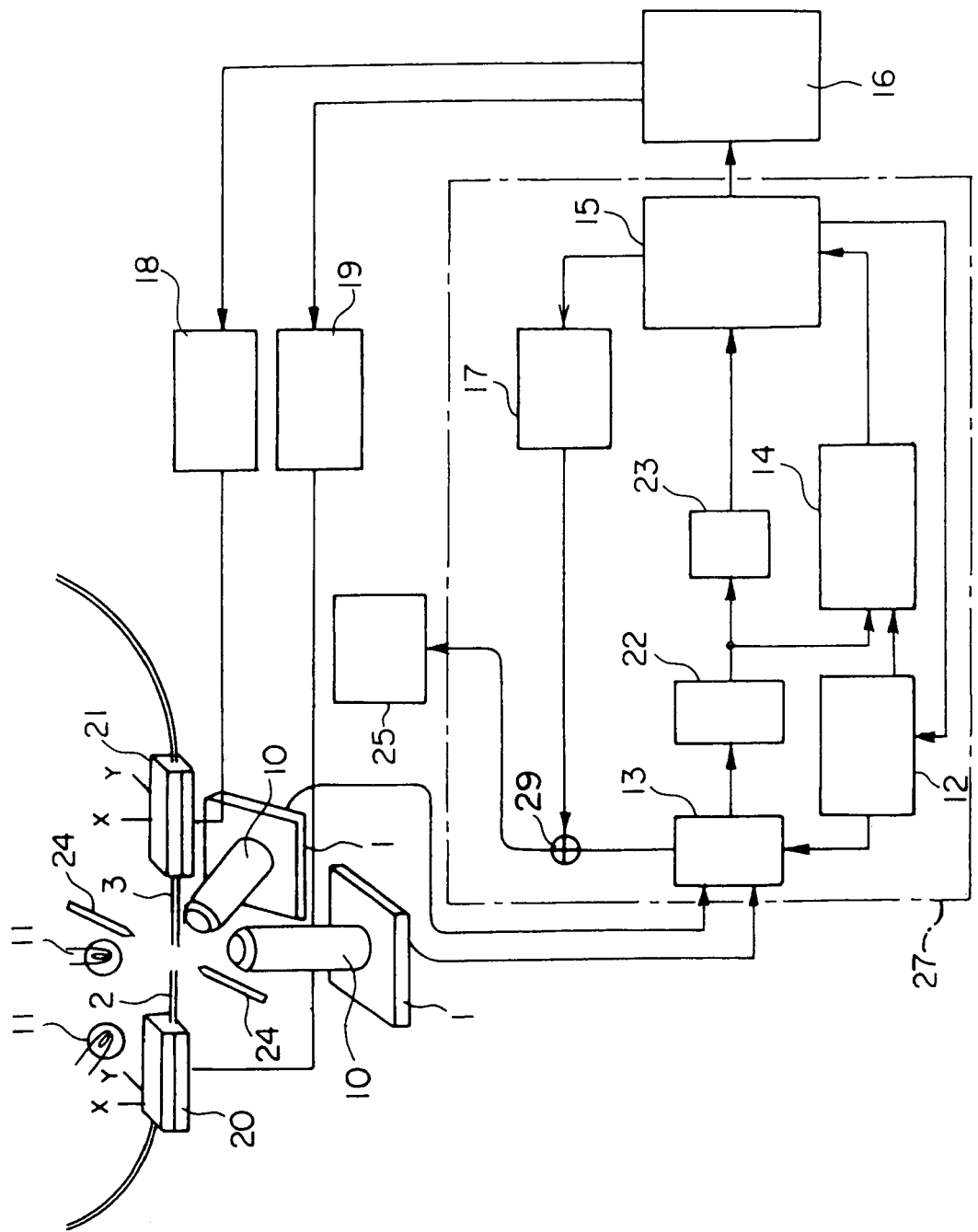
FIG. 1 is a constructional view of an entire optical fiber fusion-splicer using an optical fiber observing image processing apparatus according to the present invention.
Figure 2:
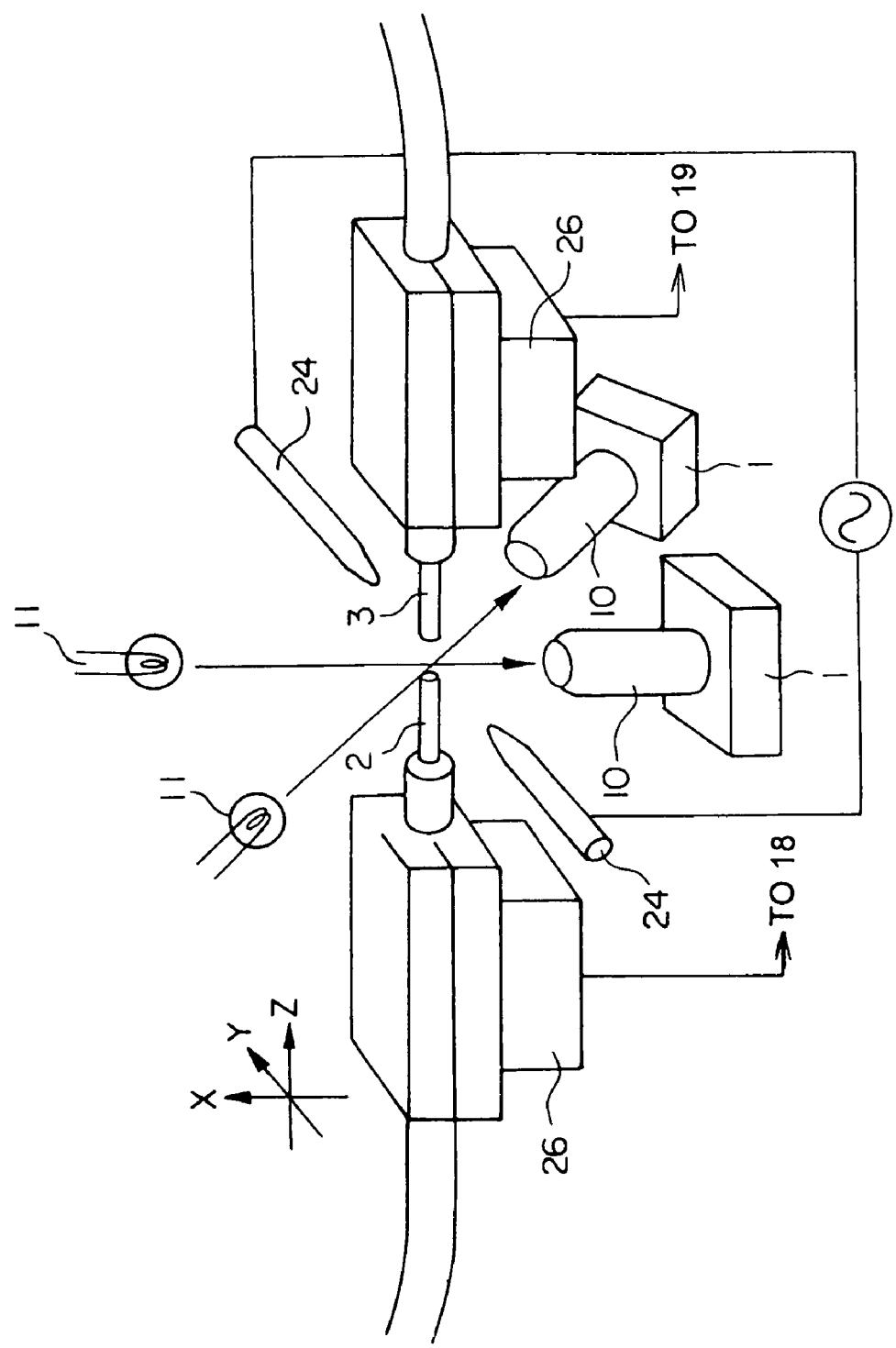
FIG. 2 is a schematic enlarged view of an optical fiber fusion-splicing portion of FIG. 1.

FIG. 1 is a schematic view of an entire optical fiber fusion-splicer constituted by using an optical fiber observing image processing apparatus 27 according to the present invention, and FIG. 2 is an enlarged view of an optical fiber fusion-splicing portion. In this optical fiber fusion-splicer, as shown in FIGS. 1 and 2, butted portions (portions to be butted) of optical fibers 2, 3 can be photo-taken by two (first and second) television cameras 1. Respective television cameras 1 are set to photo-take butted portions of optical fibers 2, 3 from each different angles in the direction vertical to optical axes. Each television camera 1 is constituted by attaching an incident optical system 10 for photo-taking the fibers 2, 3 in an enlarged form to a solid-state image sensor (not shown) such as a CCD. Light emitted from illumination light sources 11 opposite to the respective television cameras 1 with the interposition of the optical fibers 2, 3 pass through the fibers and is received by the television cameras, so that cores and clads of the optical fibers 2, 3 can be observed correctly. Each television camera 1 serves to output a video signal of NTSC system. On the basis of a synchronous signal from an input processing circuit 13 of the optical fiber observing image processing apparatus 27 according to the present invention, the television cameras output synchronized video signals.

In the optical fiber observing image processing apparatus 27 shown in FIG. 1, the video signals of NTSC system outputted from the first and second television cameras 1 are inputted to the input processing circuit 13, where optimum video signals of the television cameras 1 are selected under control of an R/W control circuit 12. The video signals are A/D-converted in an A/D converter 22 to obtain image data which are then written in a data memory (image capturing means) 14. The data memory 14 has capacity corresponding to two picture planes, and, for the writing (capturing) of the picture plane data in the data memory 14, three new capturing modes are provided, in addition to an existing capturing mode.

Modes Provided in the Image Capturing Means

Capturing mode ①: in this mode, the image from the first television camera 1 is written in the data memory 14.

Capturing mode ②: in this mode, the image from the second television camera 1 is written in the data memory 14.

Figure 6:
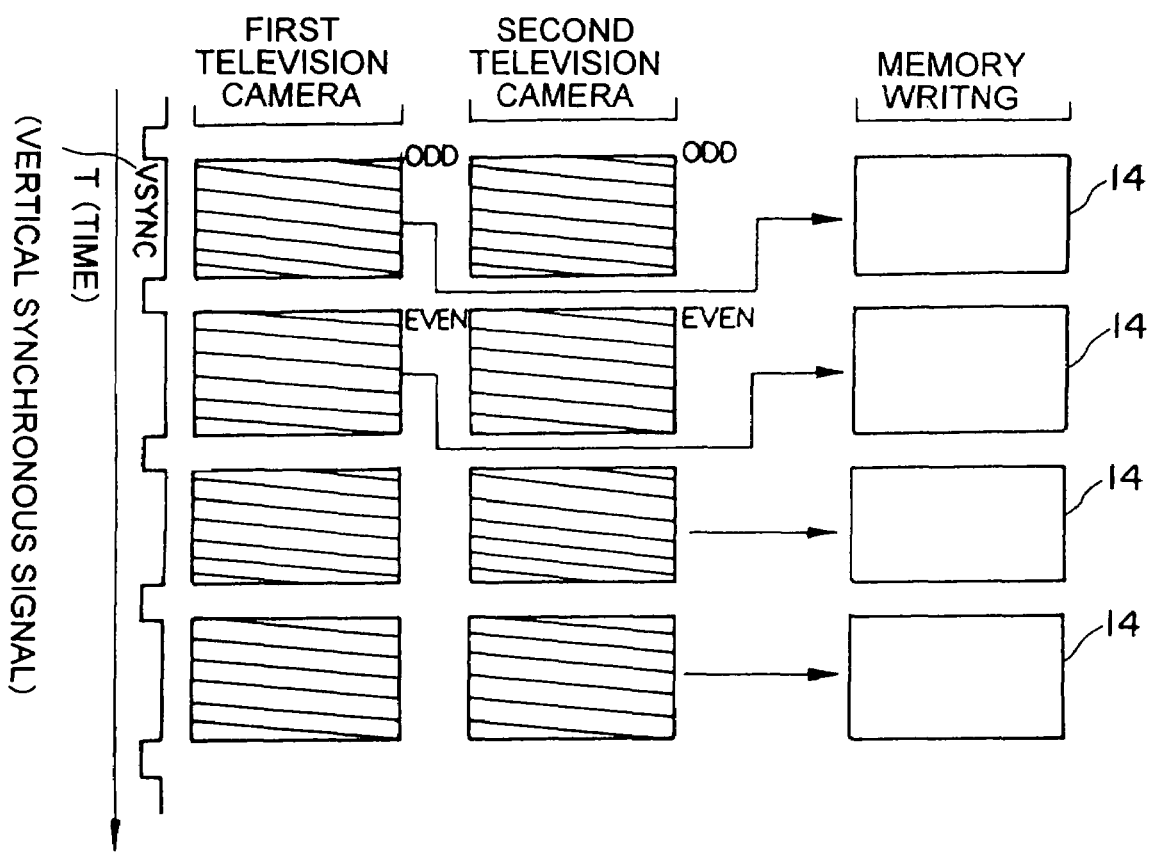
FIG. 6 is a view for explaining a capturing mode ③ in an image capturing means.

Capturing mode ③: in this mode, as shown in FIG. 6, the first and second television cameras 1 are alternately switched from frame to frame (every 1/30 second), and the images from the television cameras 1 are alternately written in the data memory 14 from frame to frame. In television cameras 1 of interlaced type, images having odd (ODD) fields and even (EVEN) fields from the first television camera 1 are written, and then images having odd fields and even fields from the second television camera 1 are written.

Figure 7:
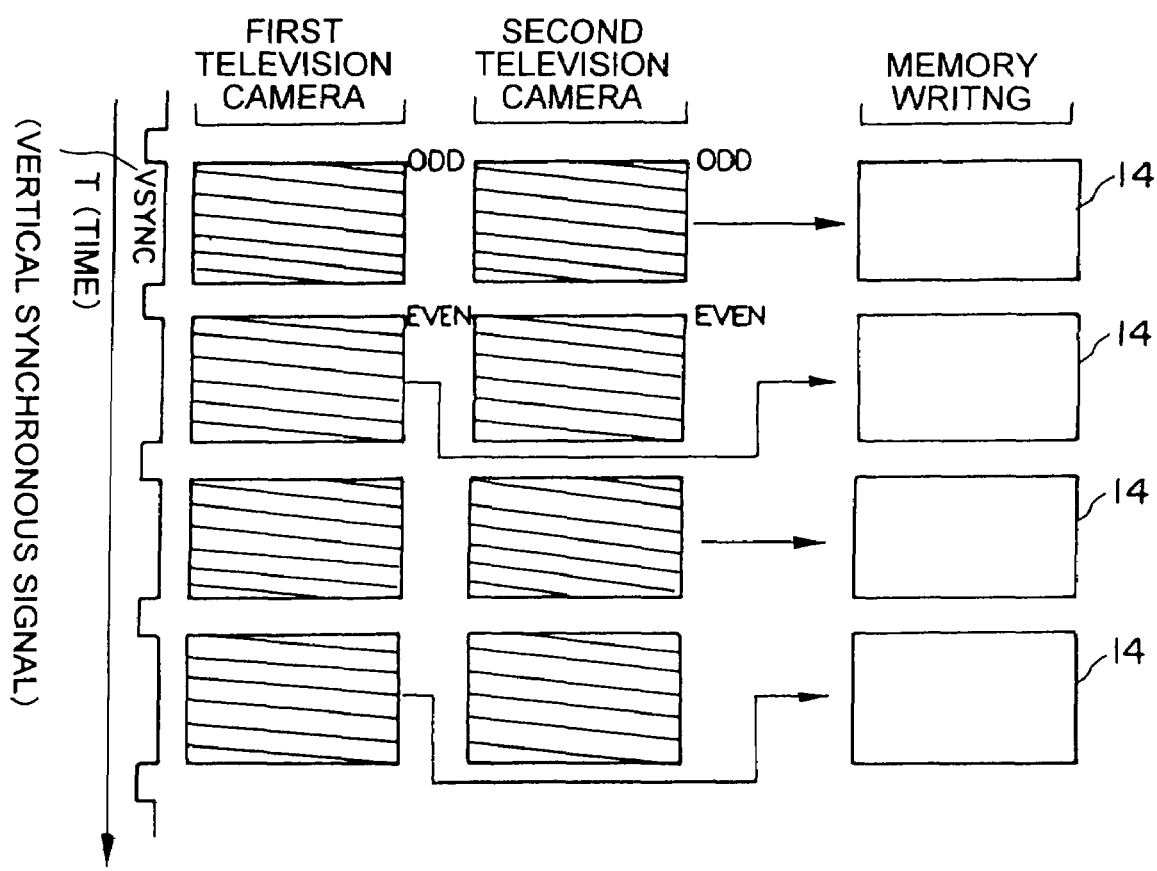
FIG. 7 is a view for explaining a capturing mode ④ in the image capturing means.

Capturing mode ④: in this mode, as shown in FIG. 7, the first and second television cameras 1 are alternately switched from field to field (every 1/60 second), and the images from the television cameras 1 are alternately written in the data memory 14 from field to field.

Figure 8:
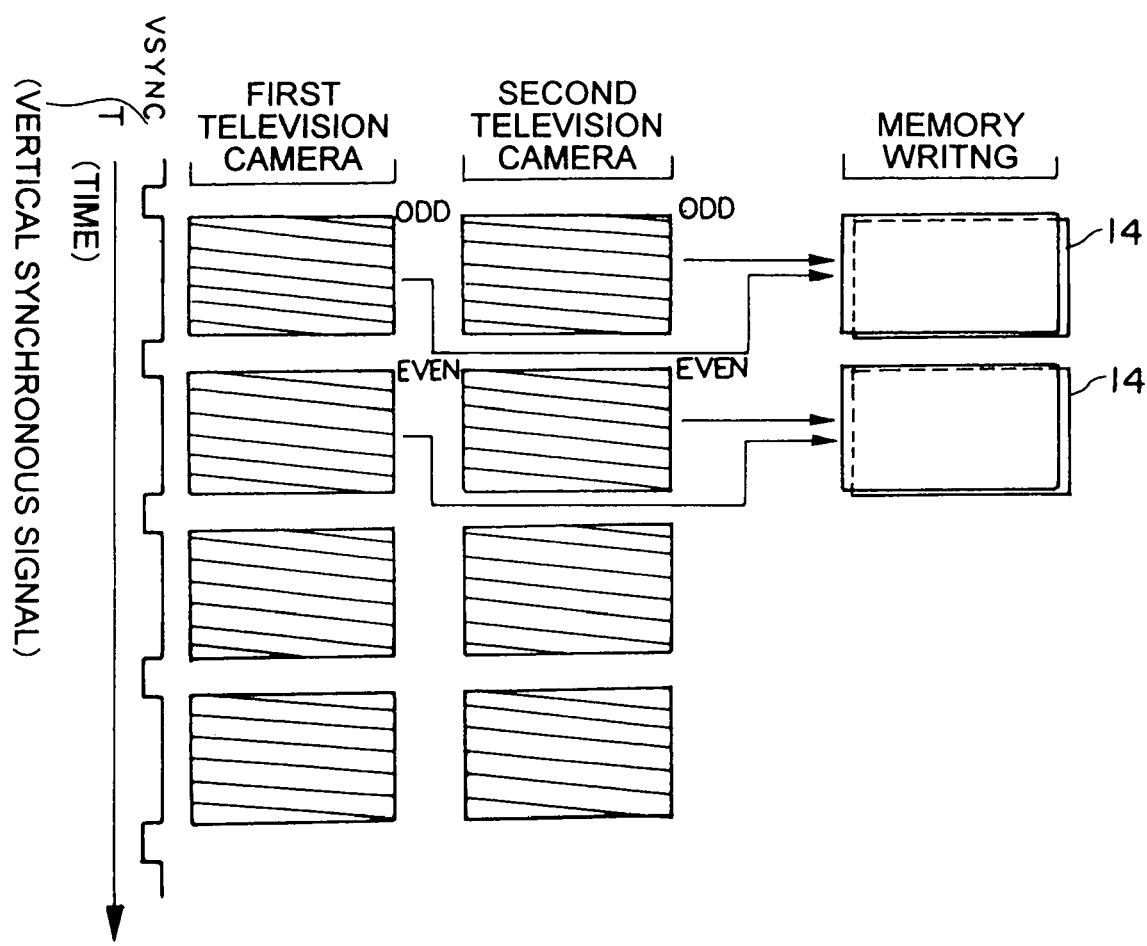
FIG. 8 is a view for explaining a capturing mode ⑤ in the image capturing means.

Capturing mode ⑤: in this mode, as shown in FIG. 8, the first and second television cameras 1 are switched from pixel to pixel, and the images from two television cameras 1 are both written in the data memory 14.

Figure 5A:
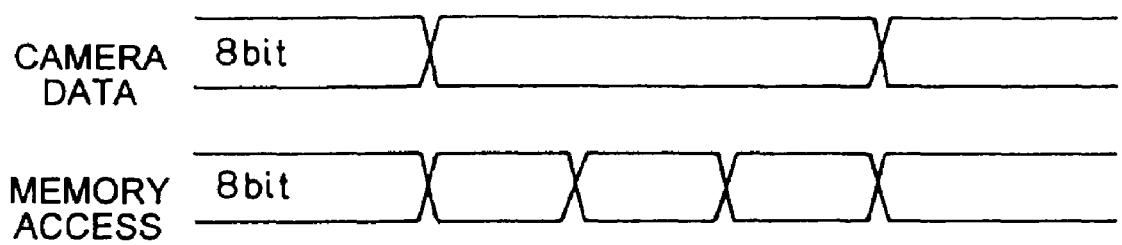
FIGS. 5A to 5C are explanatory views showing different examples of a data memory accessing method.
Figure 5B:
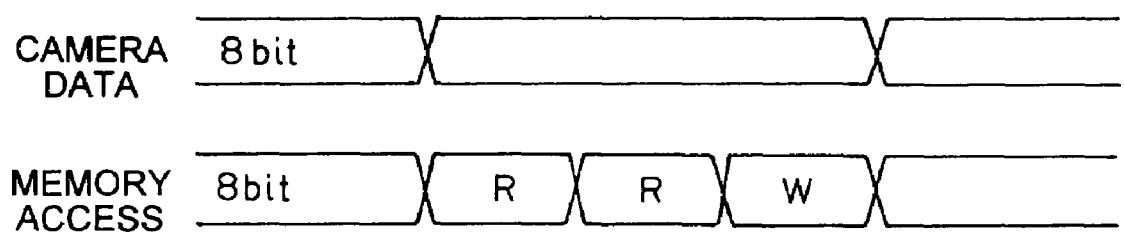
Figure 5C:
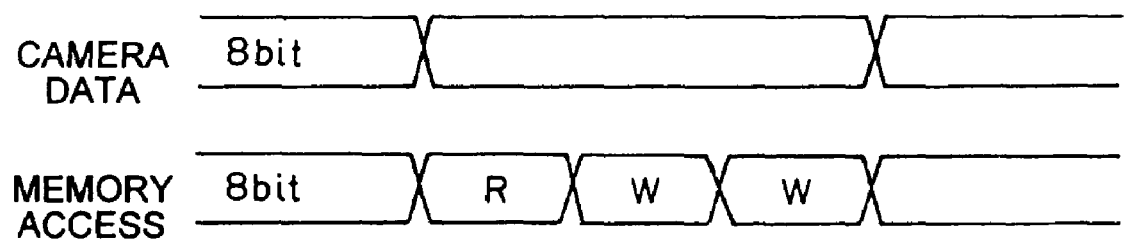

As shown in FIG. 5A, in the data memory 14 (FIG. 1), one pixel component (8 bits) of memory access can be written by three times within a period of one pixel component of the television camera 1. The access can be effected as only write-in (W) of three times or only read-out (R) of three times, and, as shown in FIG. 5B, read-out (R) of two times and write-in (W) of one time may be made, or, as shown in FIG. 5C, read-out (R) of one time and write-in (W) of two times may be made. Since the accessing method shown in FIG. 5B includes read-out (R) of two times and write-in (W) of one time, this method corresponds to the image capturing means including the capturing mode ③ and the capturing mode ④, and, since the accessing method shown in FIG. 5C includes read-out (R) of one time and write-in (W) of two times, this method corresponds to the image capturing means including the capturing mode ⑤. Accordingly, the accessing method shown in FIG. 5B in which read-out (R) can be effected by two times is suitable for effecting operations frequently and thus suitable for the image processing in an initial step of the fiber fusion-splice when the fibers 2, 3 are greatly shifted. In the accessing method shown in FIG. 5C in which read-out (R) can merely be effected by one time, although a data read-out speed is reduced by half of that in FIG. 5B, since the image data from two television cameras can be captured, this method is suitable for the image processing in a final step in which fine adjustment of the fibers 2, 3 are mainly effected.

Reference sign 23 in FIG. 1 is an interface. In a data operator 15 shown in FIG. 1, the image processing of the image data stored in the data memory 14 is performed, and, on the basis of a processed result, signals are outputted to a control circuit 16 and a graphic circuit 17 of FIG. 1. Regarding the processing in the data operator, the image data is read-out from the data memory 14, such data is processed so that information regarding deviation of optical axes of the optical fibers 2, 3, positions of the end faces of the fibers and conditions of the end faces of the fibers is operated from the image, and such information is outputted to the control circuit 16 and the graphic circuit 17. The signal outputted to the control circuit 16 is outputted to a second driving device 26 through a fiber position control circuits 18, 19, thereby driving positioning members 20, 21. The driving and image processing are repeated by several times so that the optical axes of the optical fibers 2, 3 set on the positioning member 20, 21 are gradually aligned with each other.

When information regarding progress of the image processing and information such as image processing result are outputted from the data operator 15 as data, the graphic circuit 17 (FIG. 1) forms text (characters) and/or graphic (figure) and outputs them to a video encoder 29 as a video signal. For example, text information indicating content or condition of the image processing and graphic information indicating measurement lines of the optical fibers 2, 3 are generated.

The video encoder 29 (FIG. 1) serves to compose the image signal outputted from the input processing circuit 13 with the video signal from the graphic circuit 17 to output a single signal. This video signal is inputted to a television monitor 25.

OPERATIONAL EXAMPLE

Figure 3:
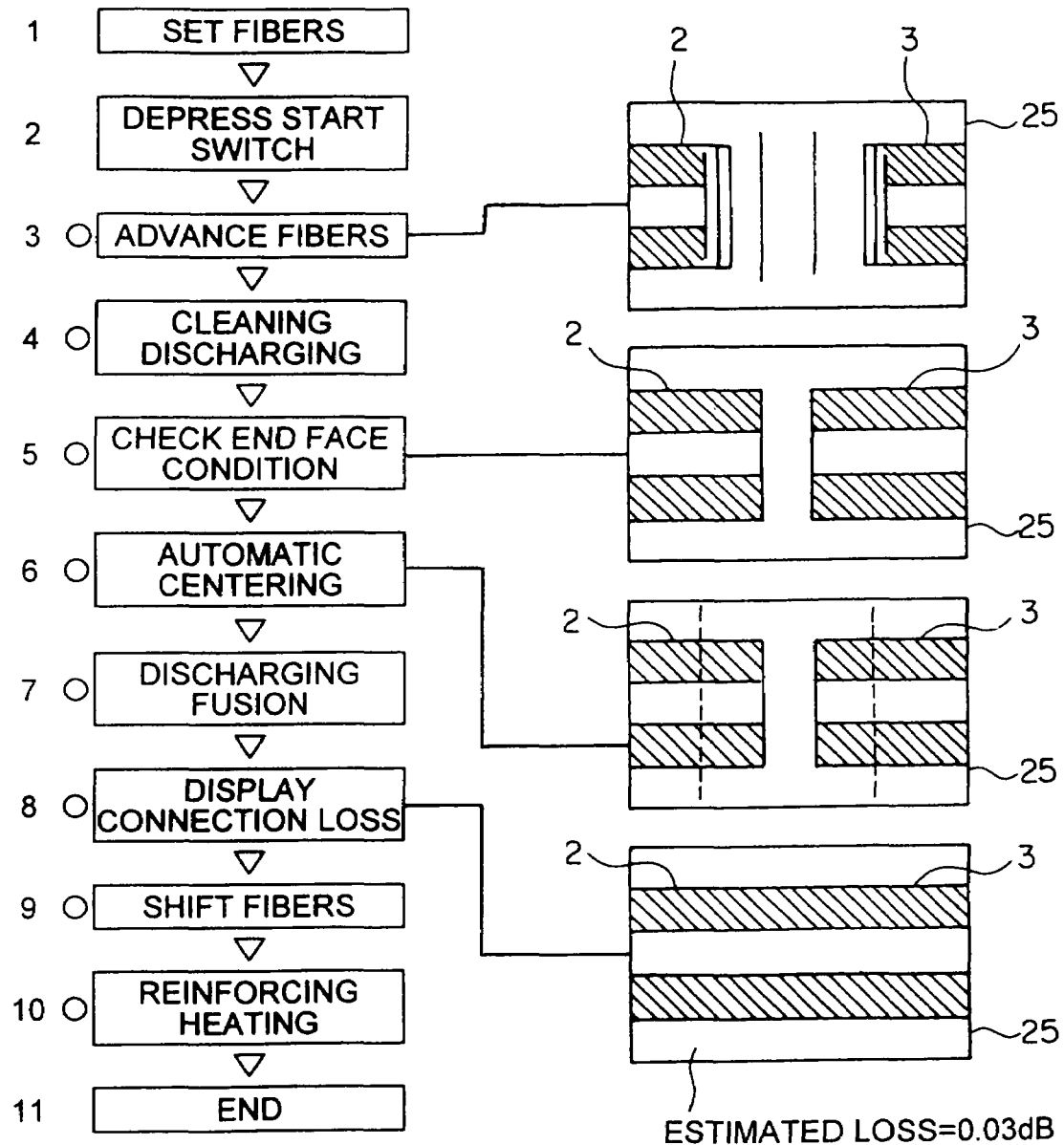
FIG. 3 is a view for explaining an example of an operation of the optical fiber fusion-splicer of FIG. 1, showing operating steps and change in condition of fibers.
Figure 4:
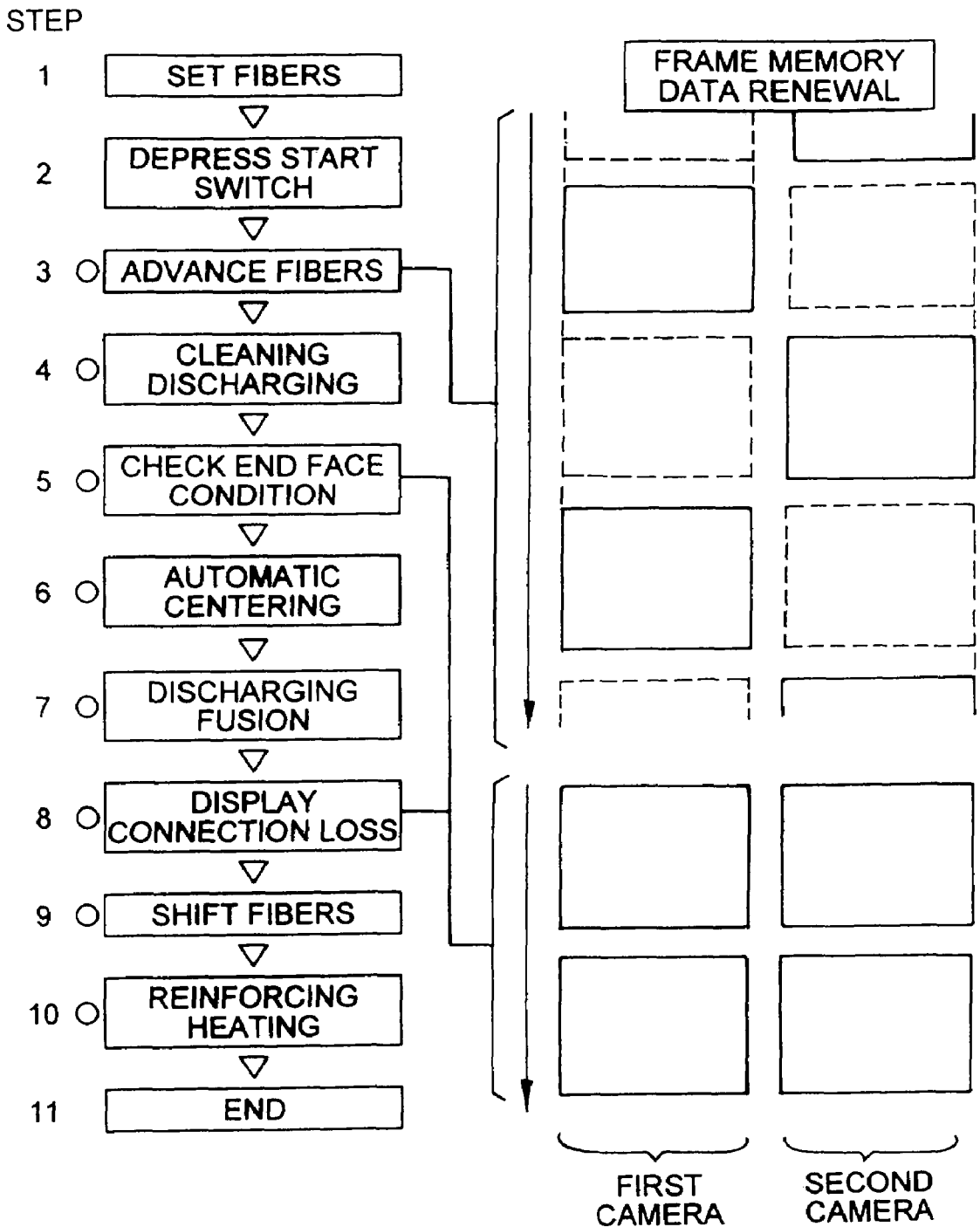
FIG. 4 is a view for explaining an example of an operation of the optical fiber fusion-splicer of FIG. 1, showing operating steps and change in capturing modes.

FIG. 3 shows an operating steps of the optical fiber fusion-splicer, together with images displayed on the television monitor, and FIG. 4 shows a relationship between the operating steps and the capturing modes. Now, the operating steps and the capturing modes will be described.

1. After the optical fibers 2, 3 (from which coatings were removed and in which end portions of the fibers were prepared) are set on the positioning members 20, 21 of the optical fiber fusion-splicer, when a start switch (not shown) is depressed, the images photo-taken by the first and second television cameras are captured into the data memory 14 in the capturing mode ④, and the optical fibers 2, 3 are advanced up to predetermined positions and are stopped there (steps 1 to 3 in FIGS. 3 and 4).

2. Weak discharging of electrode rods 24 is started, thereby cleaning end portions of the optical fibers 2, 3 (step 4 in FIGS. 3 and 4).

3. The images photo-taken by the first and second television cameras are captured into the data memory 14 in the capturing mode ⑤, and the image processing is effected in the data operator 15. In this stage, it is checked whether or not cut angles of the end faces of the optical fibers 2, 3 are within an allowable range and whether or not there is failure in the end faces (end face condition check in step 5 in FIGS. 3 and 4).

4. If there is no abnormality in the end faces, the data is further captured into the data memory 14 in the capturing mode ⑤ and the image processing is effected in the data operator 15. In this stage, the optical axes of the optical fibers 2, 3 are checked or examined, and alignment of optical axes is started. More specifically, centering regarding the image from the first television camera 1 is effected, followed by centering regarding the image from the second television camera 1, and detection of deviation between the axes and detection of distance between the end faces are carried out (step 6 in FIGS. 3 and 4).

5. After the discharging condition is set, strong discharging is effected, and fusion-splicing is effected by approaching the optical fibers 2, 3 to each other (step 7 in FIGS. 3 and 4).

6. After the connection is completed, fused and spliced portions of the optical fibers 2, 3 are photo-taken, and the photo-taken image is processed to guess or estimate light transmission loss caused by the splice, and a result is displayed on the television monitor (step 8 in FIGS. 3 and 4).

7. A reinforcing member (heat-shrinkable tube and rod-shaped reinforcing element are frequently used) is applied to the fused and spliced portions of the optical fibers 2, 3, and the reinforcing member is shrunk by heat from a heating device (not shown). In this way, the splice of the optical fibers 2, 3 is completed (steps 9 to 11 in FIGS. 3 and 4).

In the optical fiber observing image processing apparatus according to the present invention, in addition to the capturing modes ①  to ⑤, the following two capturing modes ⑥, ⑦ can be added on demand. By incorporating image processing program for properly switching such capturing modes ① to ⑦ in accordance with progress of the image processing into the data operator 15, high speed and high accurate image processing can be achieved.

Figure 9:
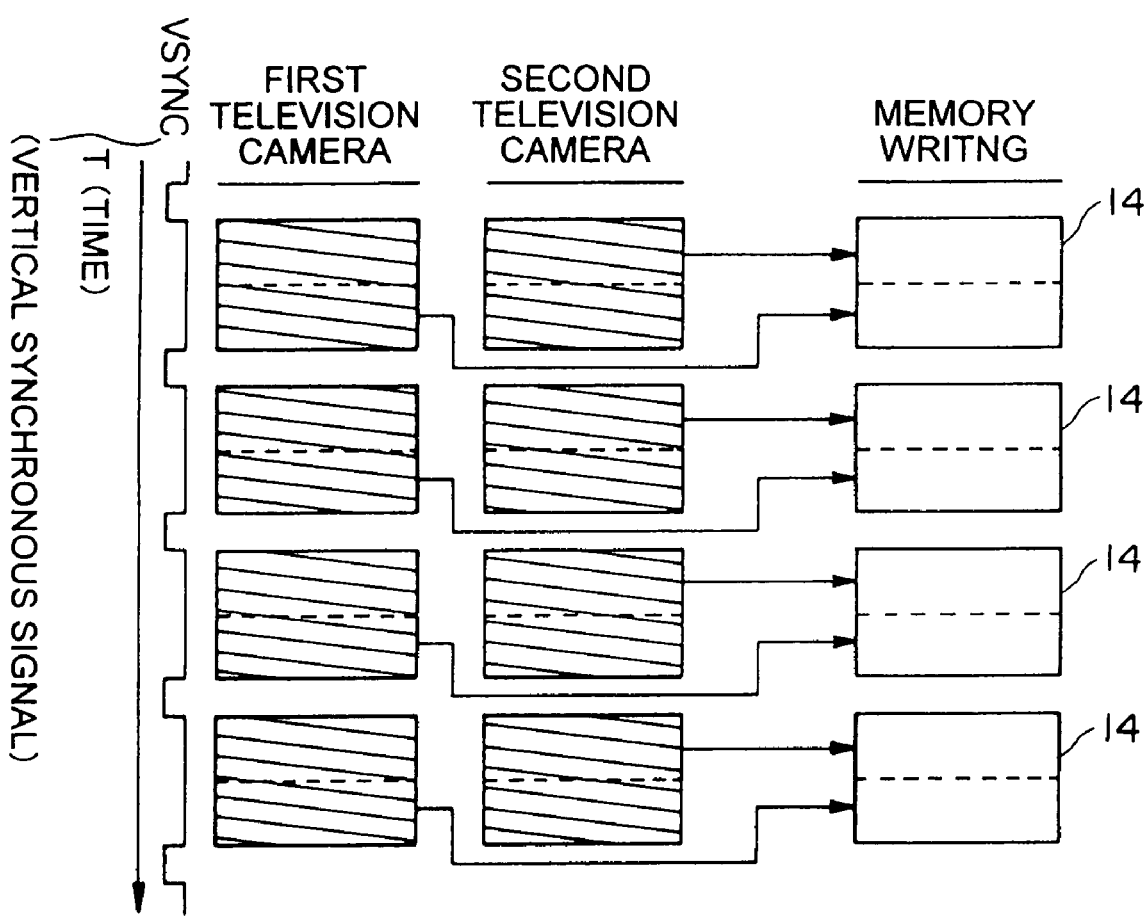
FIG. 9 is a view for explaining a capturing mode ⑥ in the image capturing means.

Capturing mode ⑥: in this mode, the images from two television cameras 1 are switched at predetermined scanning lines, and, as shown in FIG. 9, the images are divided and are written in the data memory 14 in the multiplex form. For example, after the image data of a front half of the ODD field of the second television camera 1 is captured, the input is switched to capture the image data of a rear half of the ODD field of the first television camera 1. By repeating such operation, the images from two television cameras 1 are divided into respective fields which can be in turn written in the multiplex form. FIG. 12 shows an example of image capturing in the capturing mode ⑥, in which the image from the first television camera 1 and the image from the second television camera 1 are simultaneously displayed on lower and upper parts of the television monitor 25, respectively. Incidentally, at a glance, the images includes a plurality (two) of optical fibers 2, 3 as is in images obtained by photo-taking ribbon fiber as shown in FIGS. 11A and 11B.

Figure 10:
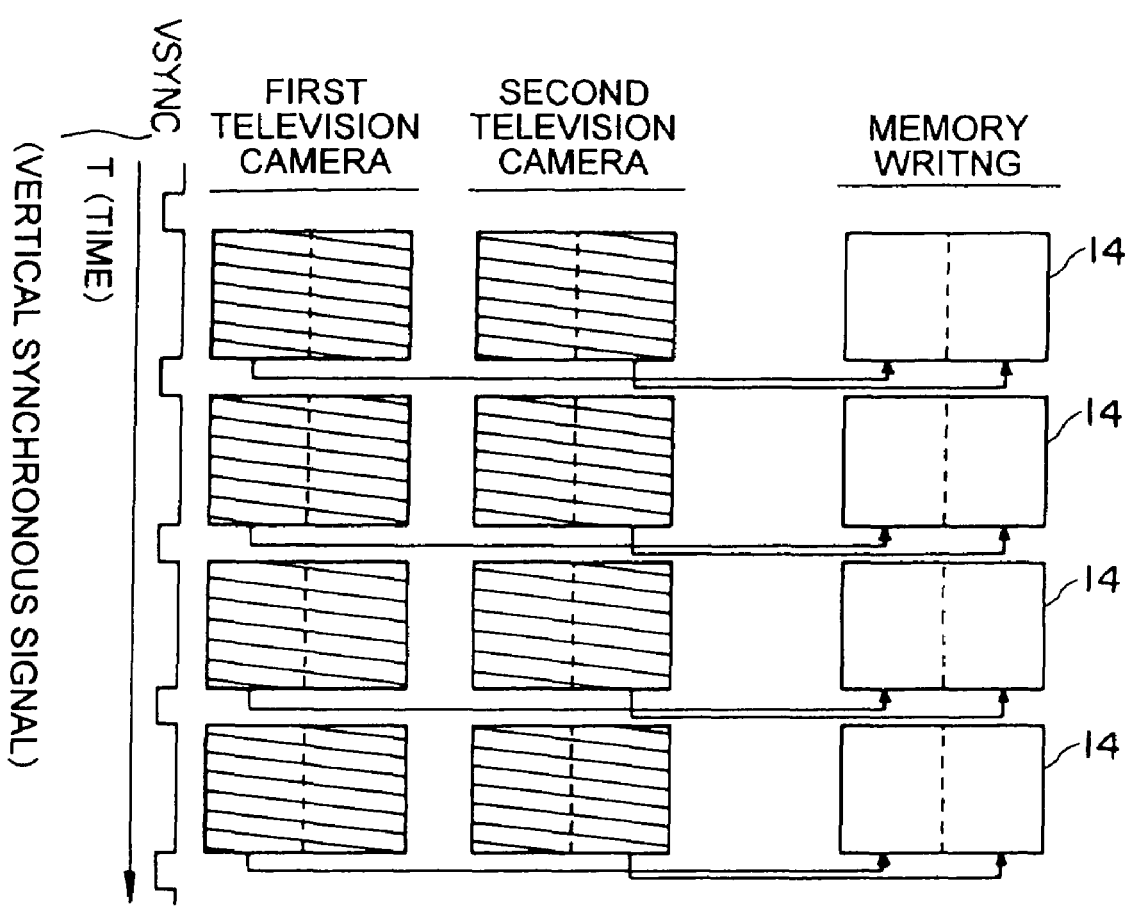
FIG. 10 is a view for explaining a capturing mode ⑦ in the image capturing means.
Figure 13:
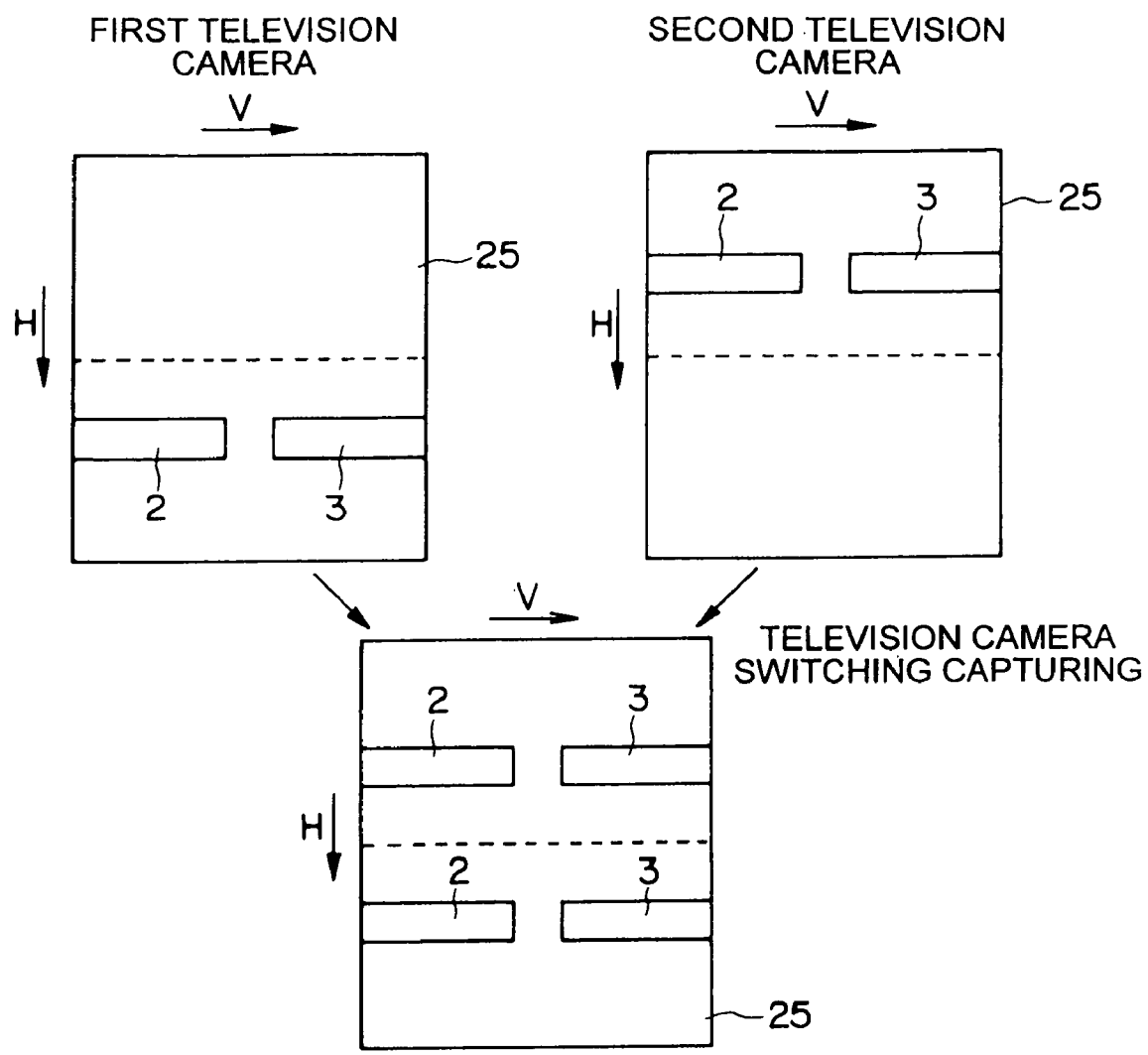
FIG. 13 is an explanatory view showing an example of image capturing in the capturing mode ⑦.

Capturing mode ⑦: in this mode, the images from two television cameras 1 are switched at predetermined pixels of scanning lines, and, as shown in FIG. 10, the images are divided and are written in the data memory 14 in the multiplex form so that two images are captured simultaneously. For example, after the image data of a front half of one scanning line of the ODD field of the first television camera 1 is captured, the input is switched to capture the image data of a rear half of one scanning line of the ODD field of the second television camera 1. Such an operation is performed for every scanning line in one field. FIG. 13 shows an example of image capturing in the capturing mode ⑦, in which the first and second television cameras 1 are both rotated by 90 degrees to change vertical and horizontal directions, and the images are photo-taken, and then the images are composed.

SECOND EMBODIMENT

Figure 14:
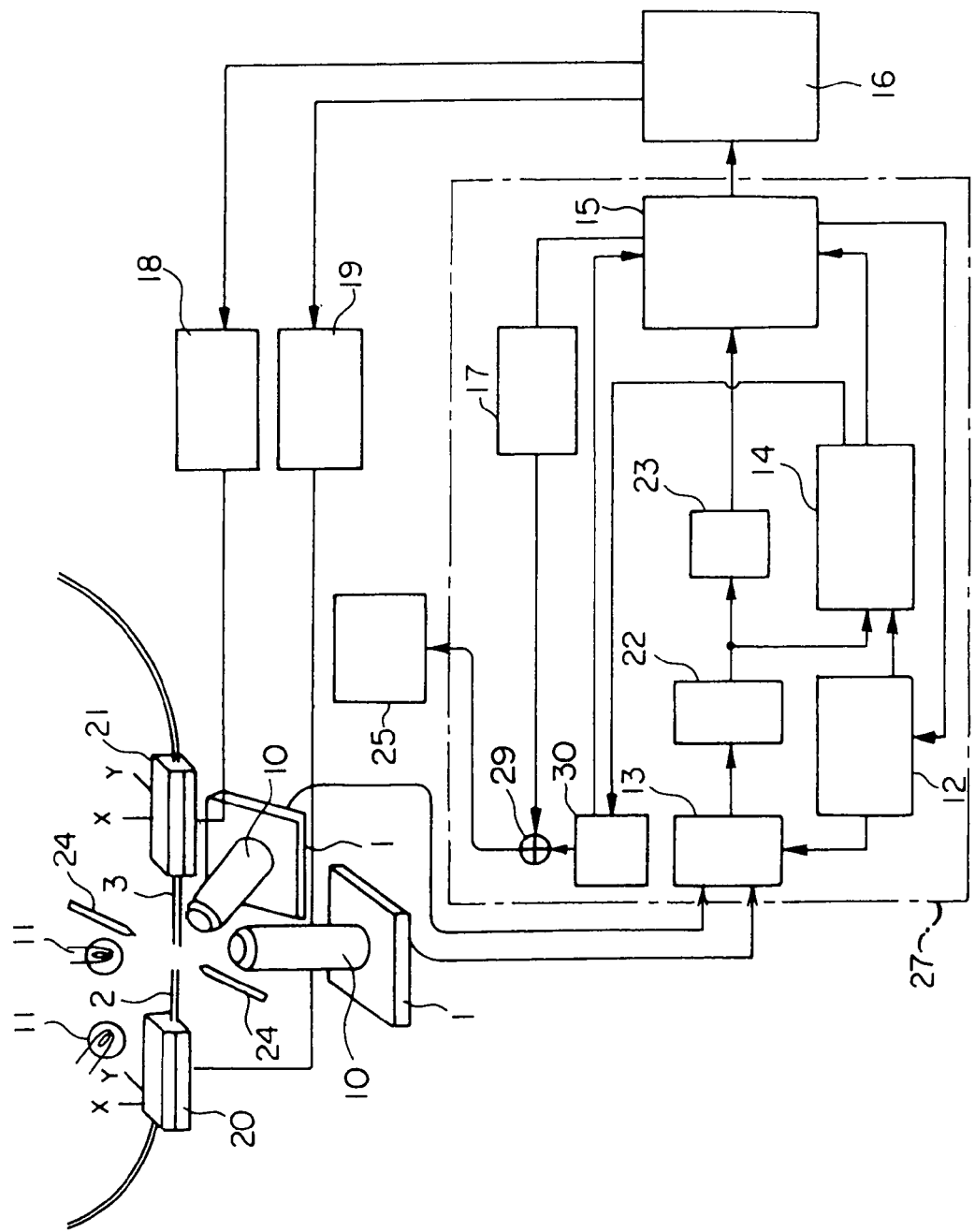
FIG. 14 is a schematic view of an entire optical fiber fusion-splicer using an optical fiber observing image processing apparatus according to the present invention, in which a scanning converter is provided.

FIG. 14 shows a second embodiment of an optical fiber observing image processing apparatus 27 according to the present invention. In this embodiment, a scanning converter (scanning converting means) 30 is incorporated into the optical fiber observing image processing apparatus 27 according to the first embodiment so that the image data captured in the data memory 14 can be displayed on the television monitor 25 through the scanning converter 30. In this case, two or more different transfer modes for transferring the image data between the data memory 14 and the scanning converter 30 can be provided. By selection of the transfer modes and selection of the capturing modes, for example, the following operation modes ① to ⑤ can be selected and switched on the basis of program. Incidentally, the scanning converter 30 serves to adjust longitudinal magnification, lateral magnification, longitudinal offset amount and lateral offset amount of the inputted image. Reference sign 23 in FIG. 1 is an interface.

Figure 19:
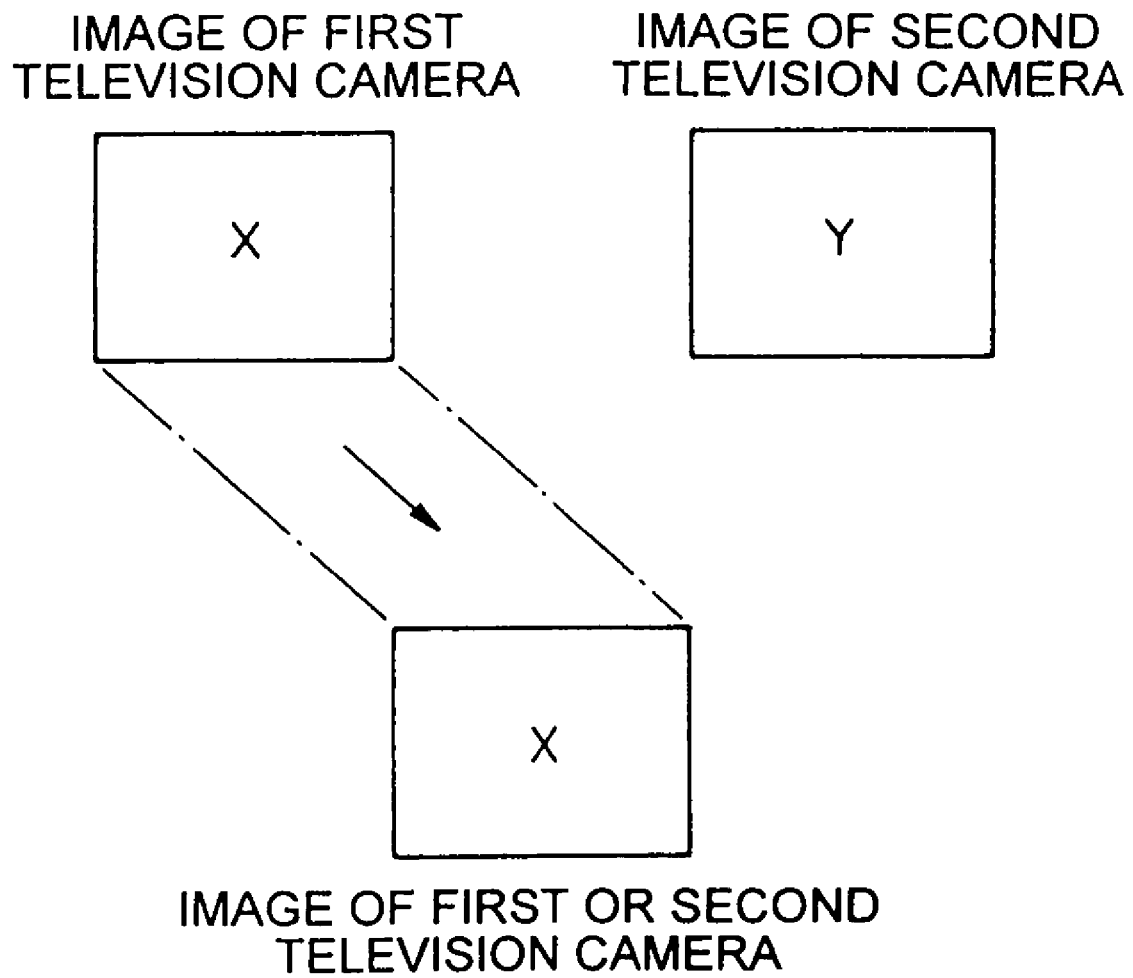
FIG. 19 is a view for explaining a transfer mode for transferring either an image photo-taken by a first television camera or an image photo-taken by a second television camera.
Figure 20:
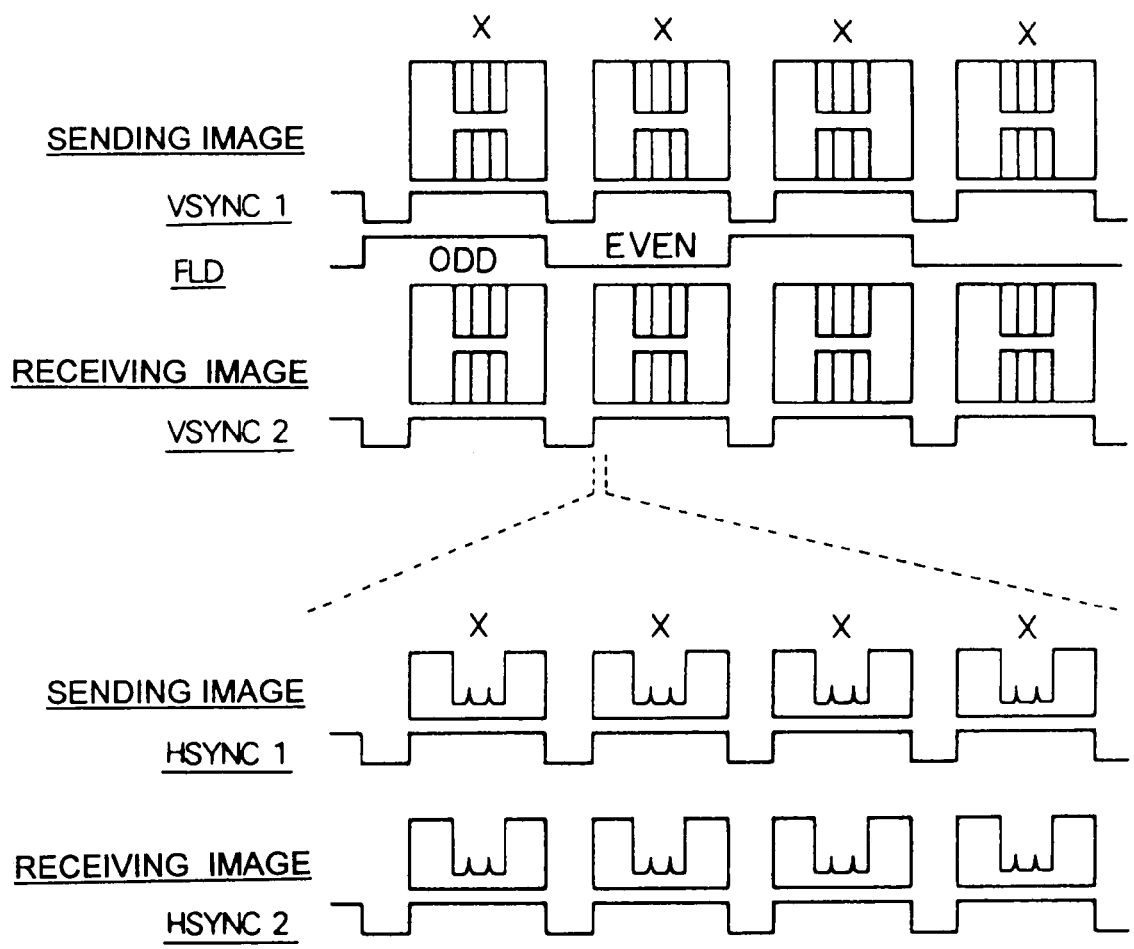
FIG. 20 is an explanatory view for explaining a data transferring method in the transfer mode of FIG. 19.

Operation mode ①: in this mode, the image data from either the first or second television camera 1 is captured and is displayed. Regarding the data memory 14, the proper mode (for example, capturing mode ① or ②) is selected among the above-mentioned capturing modes, and the image data from the first or second television camera 1 is recorded in the data memory. In the transferring (transfer mode) of data from the data memory 14 to the scanning converter 30, as shown in FIG. 20, a horizontal synchronous signal HSYNC1 of the sending side (data memory 14 side) and a horizontal synchronous signal HSYNC2 of the receiving side (scanning converter 30 side) have the same timing. Further, a vertical synchronous signal VSYNC1 of the sending side and a vertical synchronous signal VSYNC2 of the receiving side have the same timing. In addition, pixel clock signals (not shown) of the sending and receiving sides have the same timing. The sending side and the receiving side are subjected to interlaced operation. FIG. 20 shows an example when the capturing mode is selected, in which the image data from the first television camera 1 is captured into the data memory 14 and the image from the first television camera 1 is displayed on the television monitor 25 (FIG. 19).

Figure 21:
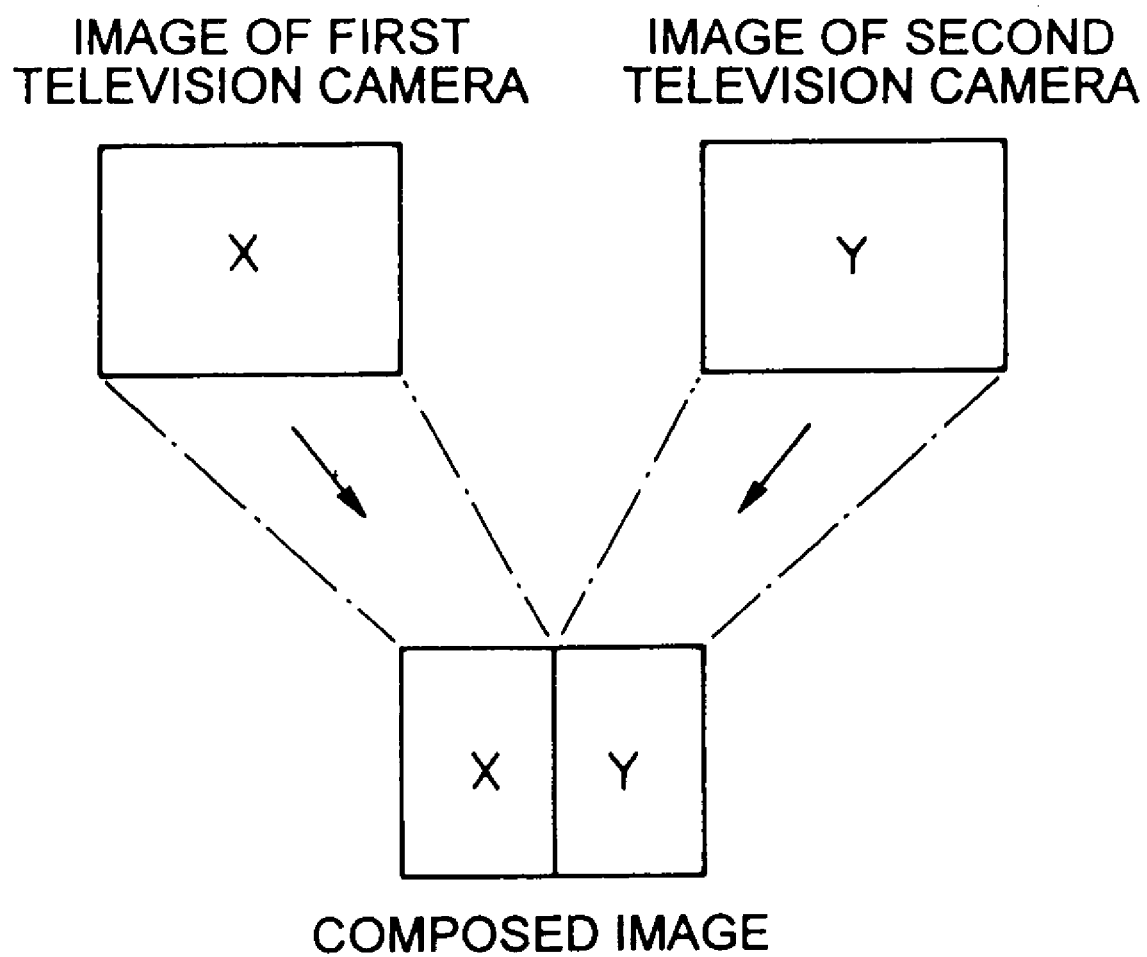
FIG. 21 is a view for explaining a transfer mode for transferring both an image photo-taken by a first television camera and an image photo-taken by a second television camera.
Figure 22:
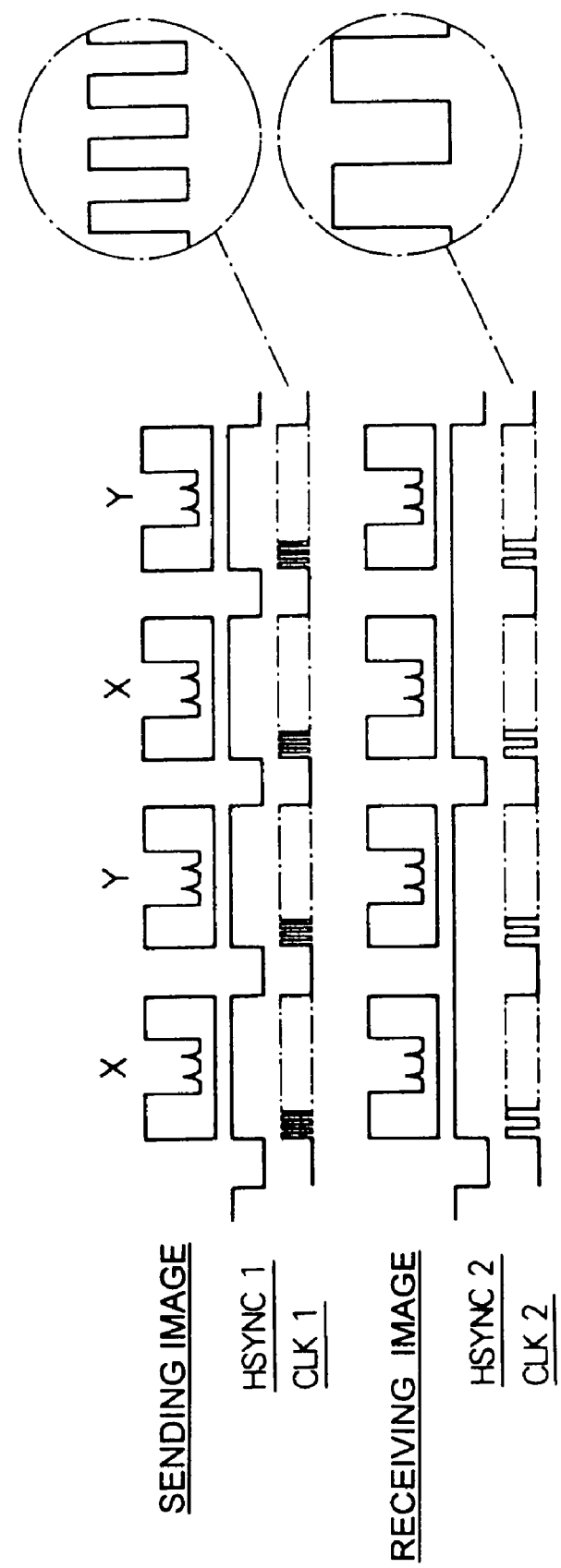
FIG. 22 is an explanatory view for explaining a data transferring method in the transfer mode of FIG. 19.

Operation mode ②: in this mode, the image data from both the first and the second television camera 1 are captured and are displayed on left and right half parts of the television monitor, as shown in FIG. 21. Regarding the data memory 14, the capturing mode capable of capturing the images from two television cameras 1 is selected and the image data from the first and second television cameras 1 are recorded in the data memory. In the transferring (transfer mode) of data from the data memory 14 to the scanning converter 30, as shown in FIG. 22, whenever a horizontal synchronous signal HSYNC1 of the sending side is switched, the image data from the first television camera and the image data from the second television camera are alternately switched to be outputted. In the receiving side, a horizontal synchronous signal HSYNC2 is set to a half period of the horizontal synchronous signal HSYNC1 of the sending side, and a pixel clock signal CLK2 is set to a half period of a pixel clock signal CLK1 of the sending side, and a vertical synchronous signal VSYNC2 is set to the same period of a vertical synchronous signal VSYNC1 of the sending side. Although the image data of the first television camera 1 and the image data of the second television camera 1 (disposed side by side) are transferred from the data memory 14 (as two picture planes), since the pixel data are thinned on alternate pixels to be transferred, a two picture plane image as shown in FIG. 21 can be obtained.

Figure 23:
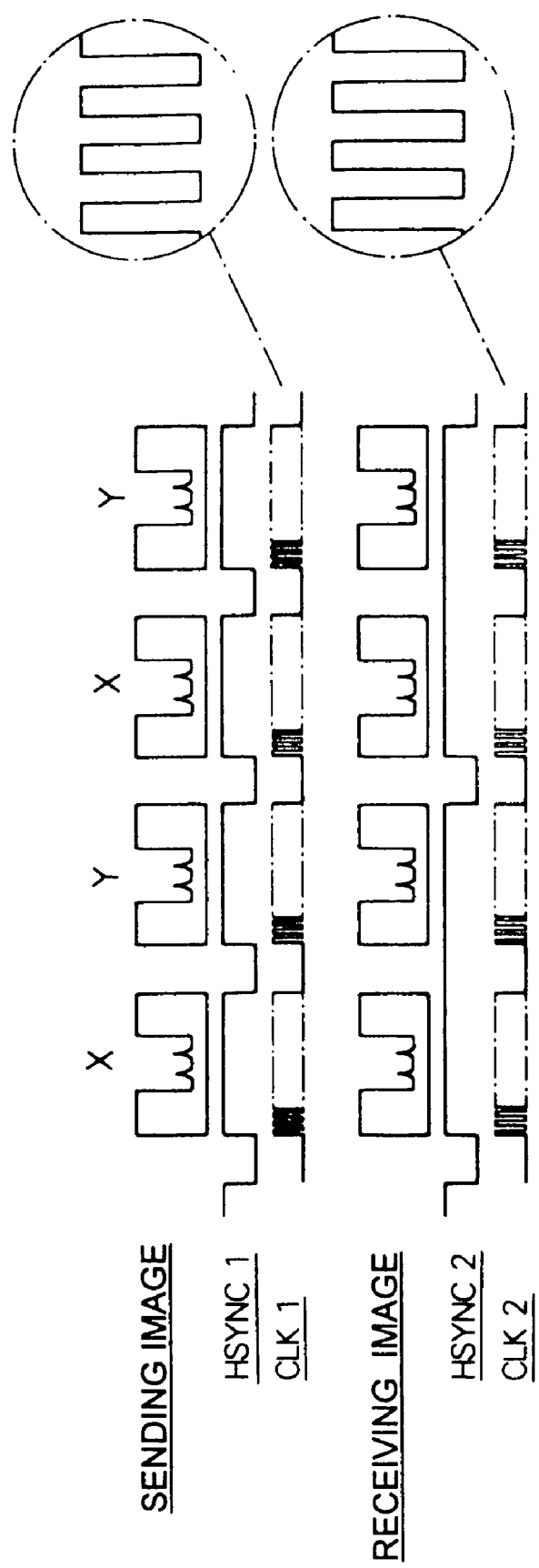
FIG. 23 is an explanatory view for explaining another example of a data transferring method in the transfer mode of FIG. 19.

Operation mode ③: as is in the operation mode ②, in this mode, the image data from both the first and the second television camera 1 are captured and are displayed on left and right half parts of the television monitor, as shown in FIG. 21. As shown in FIG. 23, in this mode, in the transferring of data, a pixel clock signal CLK1 of the sending side is set to be the same as a pixel clock signal CLK2 of the receiving side, and, by compressing the image to ½ in a horizontal direction in the scanning converter 30, the image shown in FIG. 21 (same as the image in the capturing mode of FIG. 22, at a glance) is displayed. However, the image data is transferred to the scanning converter 30 without thinning.

Figure 24:
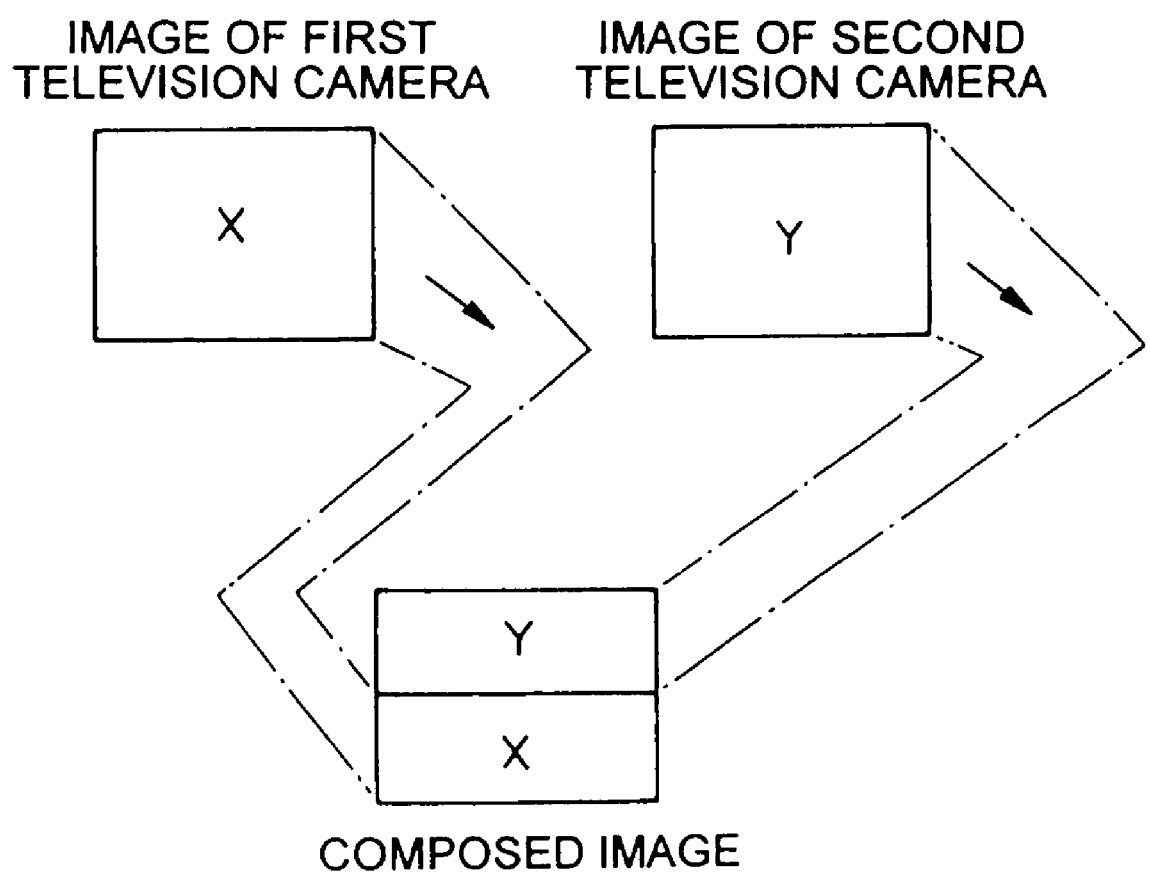
FIG. 24 is an explanatory view showing another example of a transfer mode for transferring both an image photo-taken by a first television camera and an image photo-taken by a second television camera.
Figure 25:
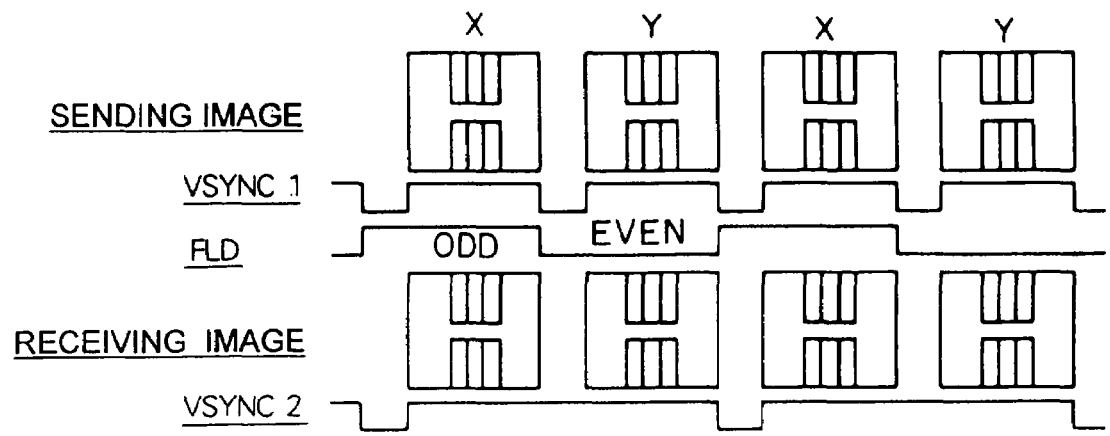
FIG. 25 is an explanatory view for explaining a data transferring method in the transfer mode of FIG. 24.

Operation mode ④: in this mode, the image data from both the first and the second television camera 1 are captured and are displayed on lower and upper half parts of the television monitor, as shown in FIG. 24. Regarding the data memory 14, the capturing mode capable of capturing the images from two television cameras 1 is selected and the image data from the first and second television cameras are recorded in the data memory. In the transferring (transfer mode) of data from the data memory 14 to the scanning converter 30, as shown in FIG. 25, whenever a vertical synchronous signal VSYNC1 of the sending side is switched, the image data from the first television camera and the image data from the second television camera are alternately switched to be outputted. In the receiving side, a vertical synchronous signal VSYNC2 is set to a half period of the vertical synchronous signal VSYNC1 of the sending side. Although the image data of the first television camera 1 and the image data of the second television camera 1 (disposed side by side in the vertical direction) are transferred from the data memory 14 (as two picture planes), since one side fields of the images from the respective television cameras 1 are transferred, a two picture plane image as shown in FIG. 24 can be obtained.

Figure 26:
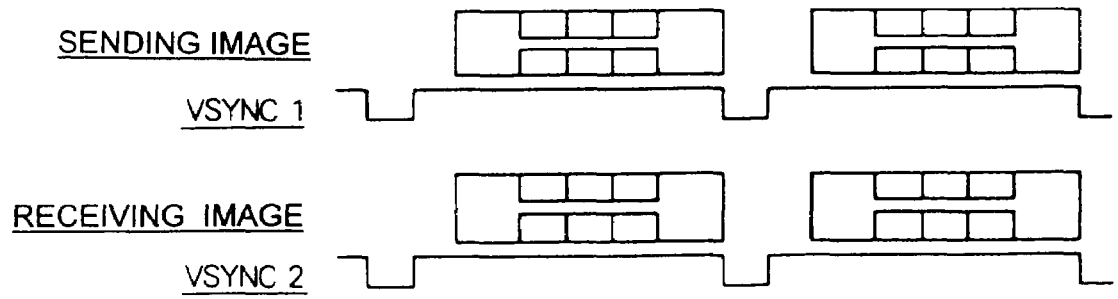
FIG. 26 is an explanatory view for explaining another example of a data transferring method in the transfer mode of FIG. 24.

Operation mode ⑤: as is in the operation mode ④, in this mode, the image data from both the first and the second television camera 1 are captured and are displayed on lower and upper half parts of the television monitor, as shown in FIG. 24. In this mode, both the sending side and the receiving side are subjected to non-interlaced operation. Whenever a vertical synchronous signal VSYNC1 of the sending side is switched, as shown in FIG. 26, the image data from the first television camera and the image data from the second television camera are alternately transferred from frame to frame. Further, a vertical synchronous signal VSYNC2 of the receiving side is set to a half period of the vertical synchronous signal VSYNC1 of the sending side. By compressing the image to ½ in a vertical direction in the scanning converter 30, the image shown in FIG. 24 (same as the image in the capturing mode of FIG. 25, at a glance) is displayed. However, the image data is transferred to the scanning converter 30 without thinning.

By constructing the program in such a manner that, when the optical fibers are shifted at a high speed, i.e., when the image is renewed at a high speed, the operation mode ② or ④ is selected, and when high accuracy (high resolving power) is requested rather than the high speed operation, the operation mode ③ or ⑤ is selected, performance of the entire optical fiber fusion-splicer can be improved.

THIRD EMBODIMENT

Figure 15:
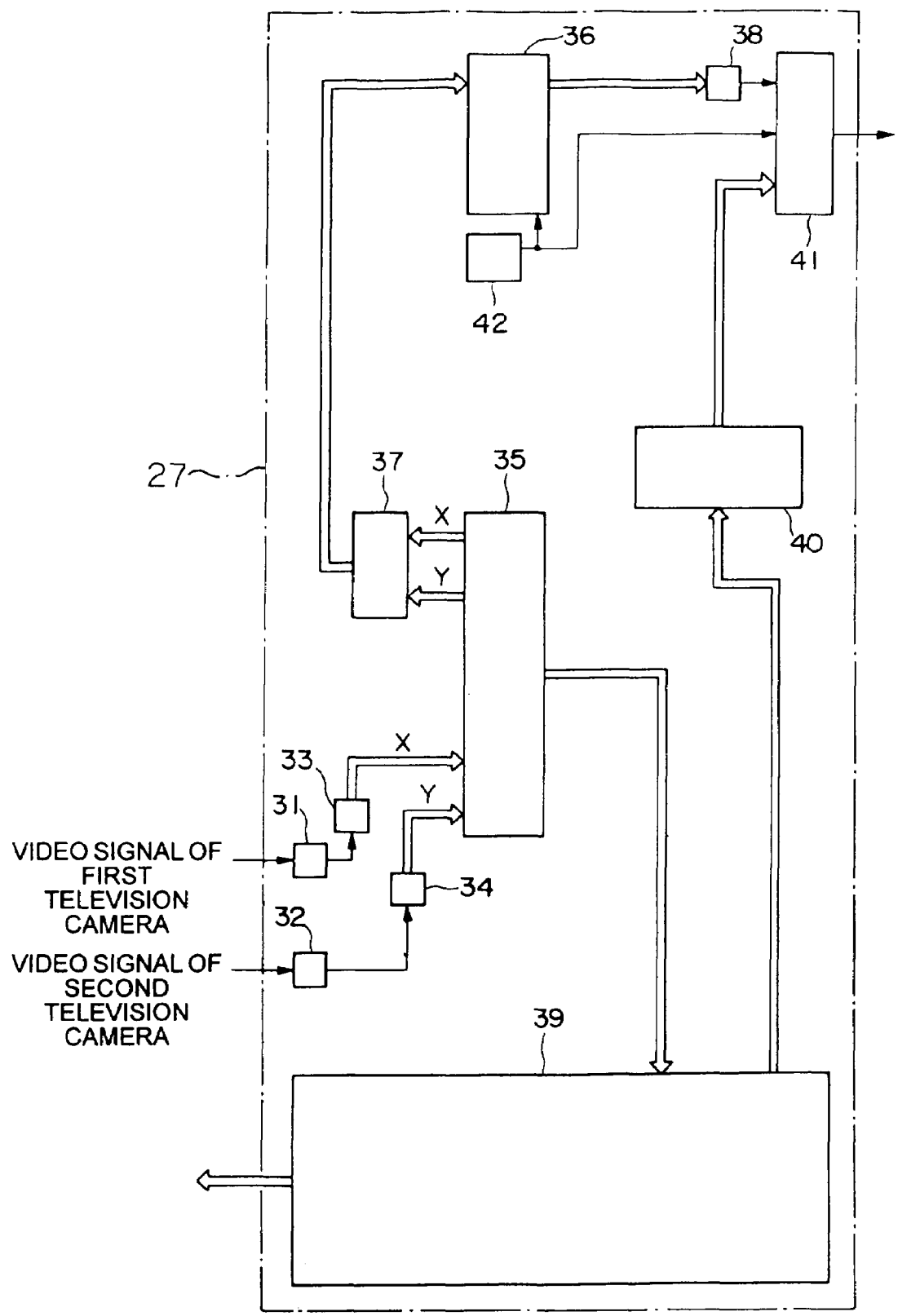
FIG. 15 is a circuit diagram showing an example of a circuitry of the optical fiber observing image processing apparatus having the scanning converter.

FIG. 15 shows a third embodiment of an optical fiber observing image processing apparatus 27 according to the present invention. In this embodiment, there are provided first and second input processing circuits 31, 32 into which the video signals from the first and second television cameras are inputted, first and second A/D converters 33, 34 for A/D-converting the respective video signals, a data memory 35 for storing the A/D-converted image data, a selector 37 for switching the image data of the data memory 35 to send the data to a scanning converter 36 which adjusts longitudinal magnification, lateral magnification, longitudinal offset amount and lateral offset amount of the image, a D/A converter 38 for D/A-converting the image data from the scanning converter 36, a data operator 39 for processing the image data stored in the data memory 35, a graphic circuit 40 for forming various graphics on the basis of the processing in the data calculator 39, a video encoder 41 for composing the image data from the scanning converter 36 with the image data from the graphic circuit 40, and a synchronous signal generator 42 for generating an output side synchronous signal. That is to say, the image data outputted from the first television camera 1 and the second television camera 1 and stored in the data memory 35 is selected by the selector 37 and the selected data is sent to the scanning converter 36 so that the image data from the first television camera 1, the image data from the second television camera 1 or the image data obtained by composing the image data from both cameras with each other is outputted through the scanning converter 36.

FOURTH EMBODIMENT

Figure 16:
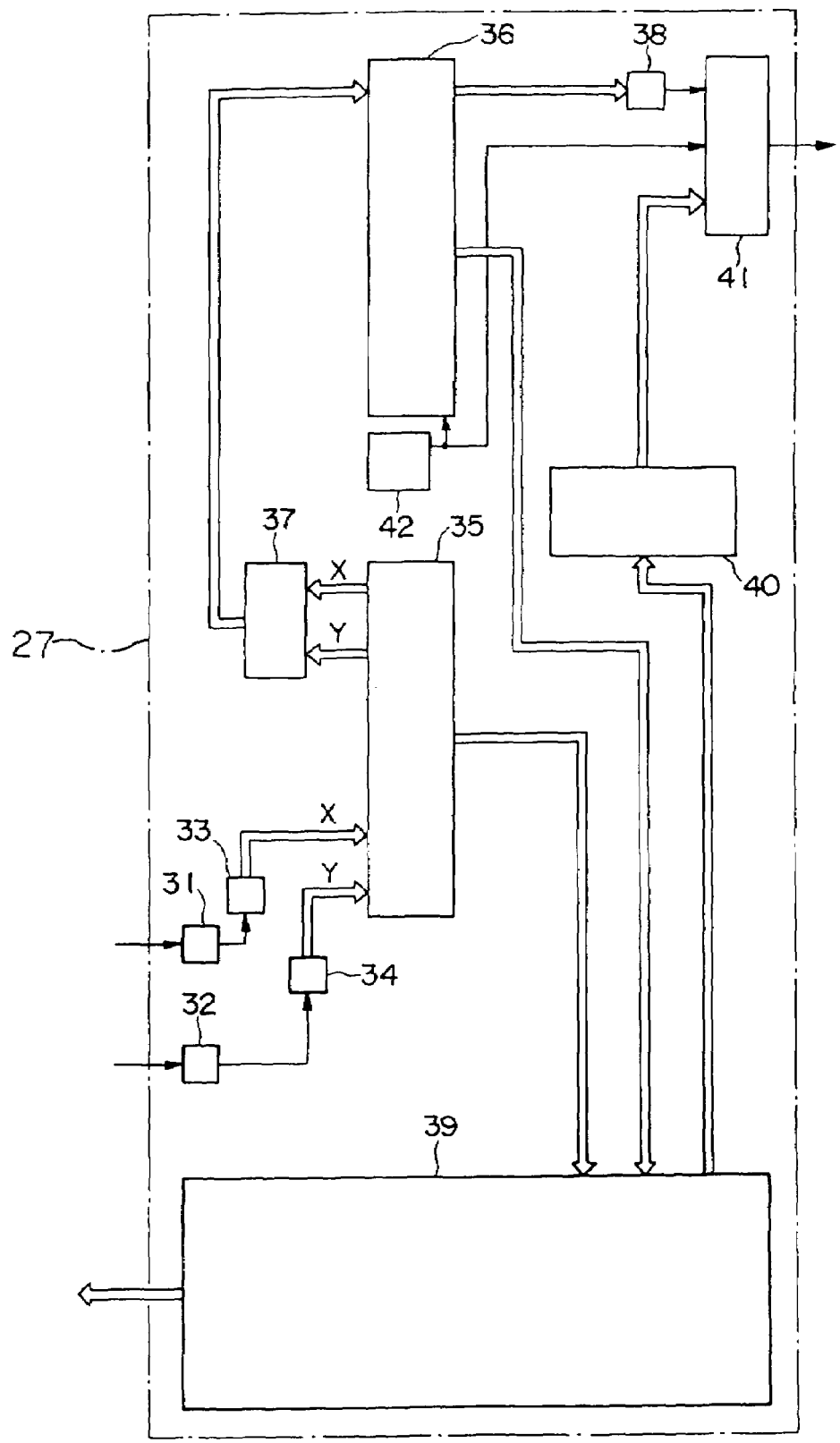
FIG. 16 is a circuit diagram showing another example of a circuitry of the optical fiber observing image processing apparatus having the scanning converter.

FIG. 16 shows a fourth embodiment of an optical fiber observing image processing apparatus 27 according to the present invention. In this embodiment, the scanning converter 36 of the optical fiber observing image processing apparatus 27 of FIG. 15 can be controlled by the data calculator 39 and the image data from the scanning converting device 36 is transferred to the data calculator 39 to permit data processing. In this case, since the image data stored in the data memory 35 and the image data stored in the scanning converter 36 can be image-processed on demand, for example, processing in which the image data being captured presently is compared with the image data of previous frame can be effected. Further, since data not requiring real time ability can be divided and stored in both the data memory 35 and the scanning converter 36, the load of the entire image processing apparatus can be reduced. In this case, the operating frequency of the image processing apparatus is decreased to save an electric power, thereby reducing the running cost.

In the optical fiber observing image processing apparatuses 27 of the present invention shown in FIGS. 15 and 16, the input processing circuits 31, 32, A/D converters 33, 34 and D/A converter 38 are available from the market, and the data memory 35 and the scanning converter 36 can easily be obtained from the market so long as they have the following construction or the similar function.

Figure 17:
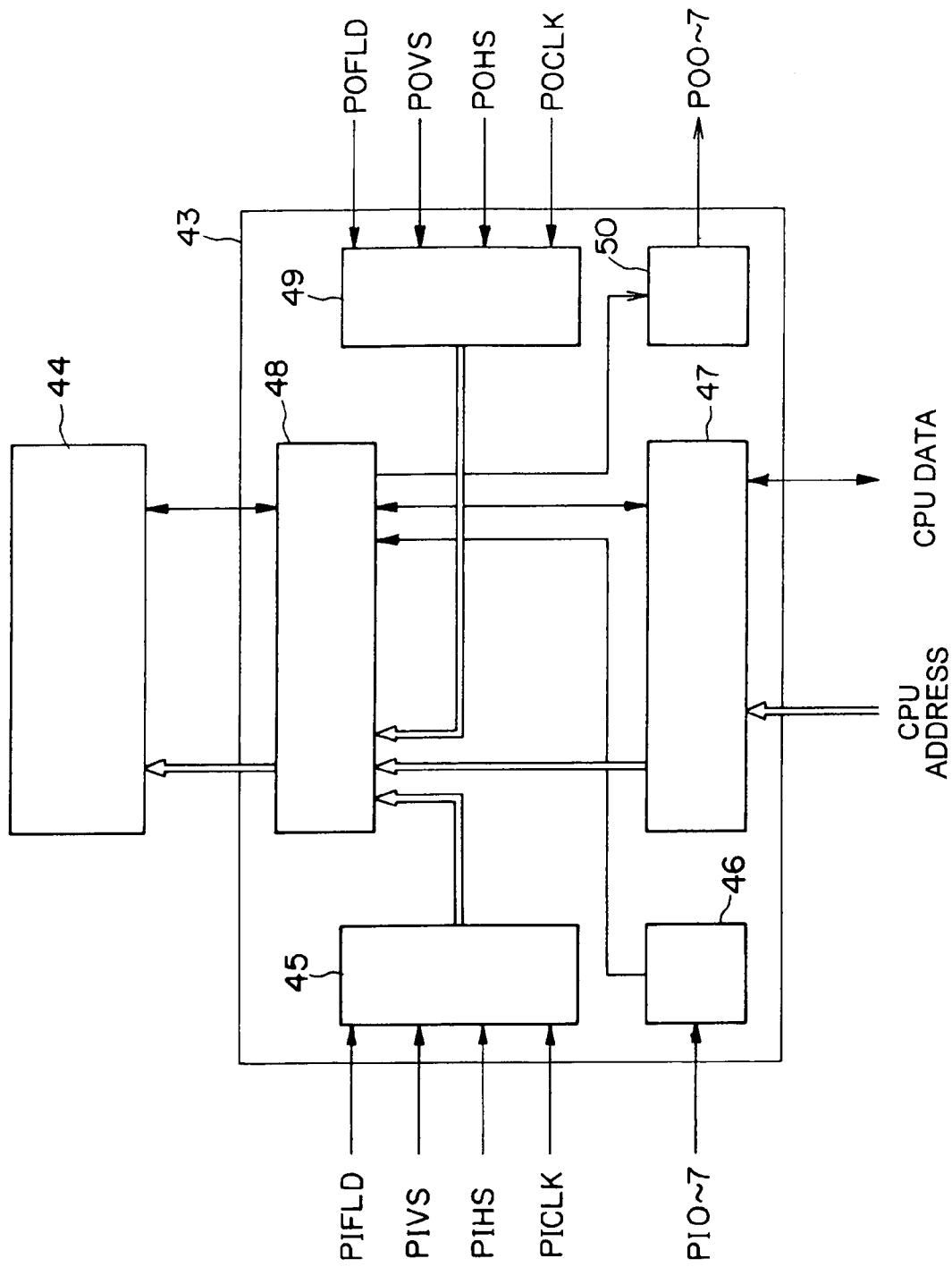
FIG. 17 is a circuit diagram of a data memory used in the image capturing means.

The data memory 35 shown in FIG. 16 comprises an image controller 43 and an image memory 44 as shown in FIG. 17, and the image controller 43 is constituted by a write-in address forming circuit 45, an image input buffer 46, a CPU interface 47, an image memory interface 48, a read-out address forming circuit 49 and an image output buffer 50. The image data is captured into the image input buffer 46 through image input ports PI0 to PI7 in synchronous with clock PICLK inputted to the image input port. In this case, in the write-in address forming circuit 45, write-in address is formed in accordance with a field discrimination signal PIFLD inputted to the image input port, a signal PIVS indicating a picture plane start position (upper edge of picture plane), a signal PIHS indicating a column start position (left edge of picture plane) and clock PICLK, and, on the basis of such address, the data transferred to the input buffer 46 is transferred to the image memory 44 through the image memory interface 48. The image memory interface 48 serves to control an input side, an output side, CPU interface 47 and image memory 44 (intervention of refresh operation of the image memory may be effected in dependence upon the kind of the image memory). The image data stored in the image memory 44 is read-out through the image memory interface 48 on the basis of read-out address formed in the read-out address forming circuit 49 (which address is formed on the basis of a field discrimination signal P0FLD inputted to an image output port, a signal P0VS indicating a picture plane start position (upper edge of picture plane), and a signal P0HS indicating a column start position (left edge of picture plane)), and the read-out data is transferred to the image output buffer 50. In the image output buffer 50, the image data is outputted to image output ports P00 to P07 in synchronous with clock P0CLK inputted to the image output port.

Figure 18:
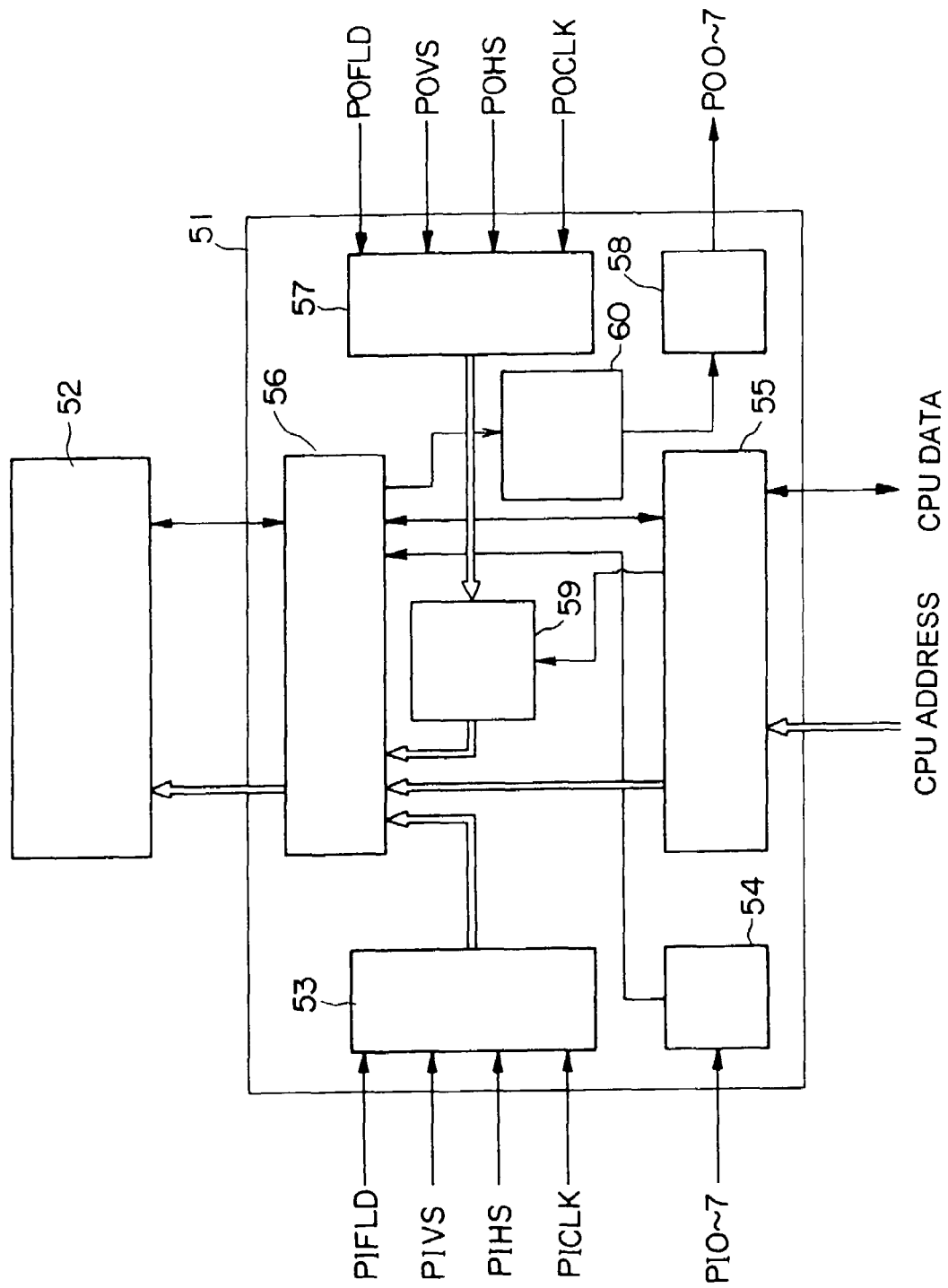
FIG. 18 is a circuit diagram of a scanning converter used as a scanning converting means.

The scanning converter 36 of FIG. 16 comprises an image processing processor 51 and an image memory 52, as shown in FIG. 18, and the image processing processor 51 is constituted by a write-in address forming circuit 53, an image input buffer 54, a CPU interface 55, an image memory interface 56, a read-out address forming circuit 57, an image output buffer 58, an address converting table 59 and an interpolation operational circuit 60.

This image processing processor 51 is constituted by adding the address converting table 59 and the interpolation operational circuit 60 to the image controller 43 of the data memory 35, and writing-in of the image data in the image memory 52 and reading-out of the image data from the image memory 52 are fundamentally effected in the same manner as the data memory 35.

However, the address converting table 59 and the interpolation operational circuit 60 are provided, and the address converting table 59 is provided with an address converting function for rotating the image by 90 degrees, and the interpolation operational circuit 60 is provided with a function for correcting the pixel data when the number of pixels is increased or decreased, so that, the picture plane can be displayed even when the number of pixels in the vertical and horizontal directions is changed by rotating the picture plane by 90 degrees and contraction or enlargement of the picture plane is required in dependence upon the pixel data transfer mode between the front stage data memory 35 and the scanning converter 36. In the mode in which the thinning is effected with integral times of a ratio between the number of pixels in the vertical direction and the number of pixels in the horizontal direction, merely passing may be made (for example, the thinning as shown in FIG. 25 is effected to obtain the picture plane as shown in FIG. 24). Incidentally, as the address converting table 59, a memory IC (ROM, RAM) in which the data after rotated by 90 degrees is previously stored, a device for writing-in connection of operational circuit (PLD: programmable logic device) or a device for writing-in operation program (ALU: arithmetic and logic unit) may be used.

FIFTH EMBODIMENT

Figure 27:
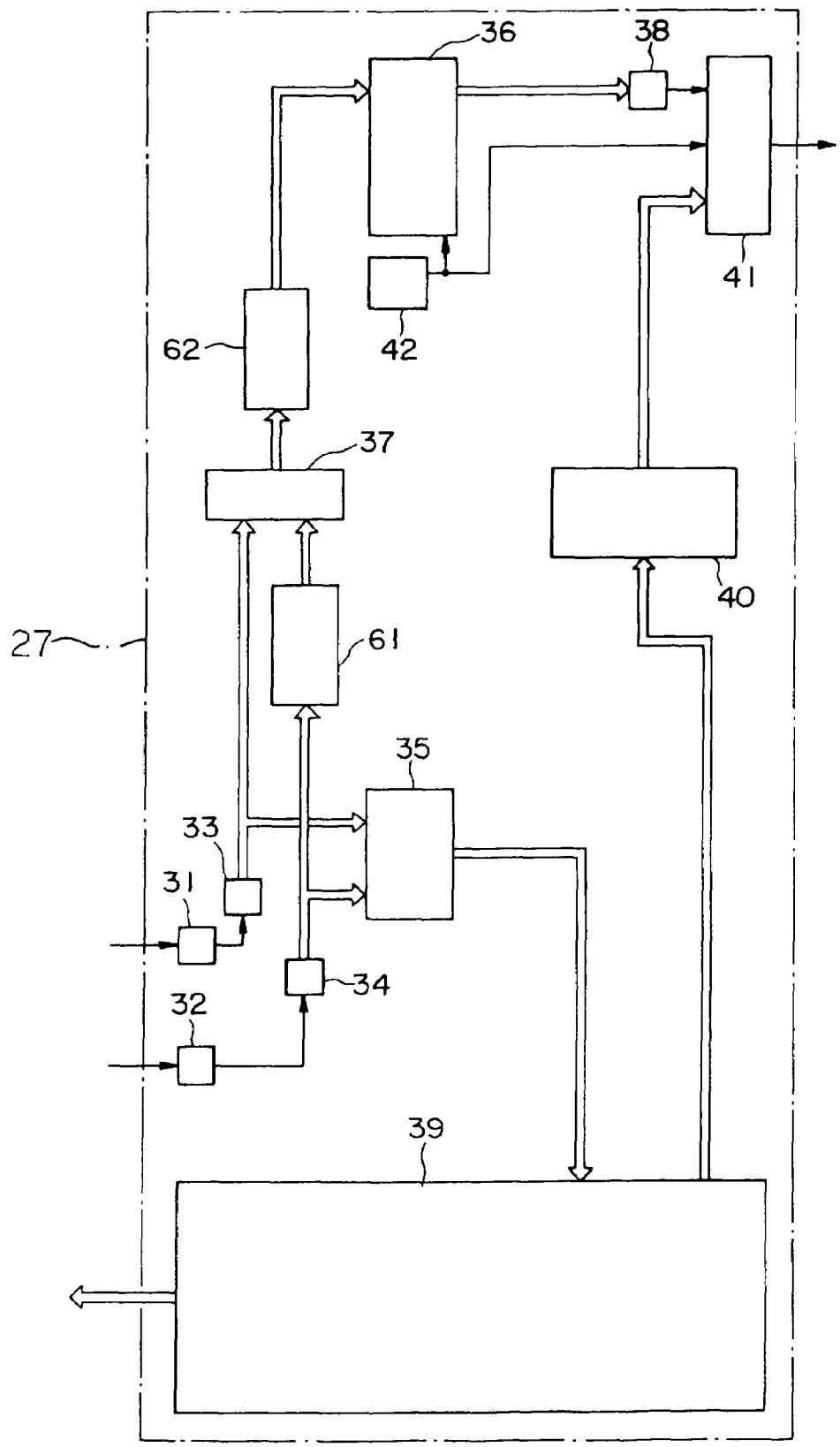
FIG. 27 is a circuit diagram showing another example of a circuitry of the optical fiber observing image processing apparatus having the scanning converter.

FIG. 27 shows a fifth embodiment of a fiber observing image processing apparatus 27 according to the present invention. In this embodiment, there are provided first and second input processing circuits 31, 32, first and second A/D converters 33, 34, a data memory 35, a first delay circuit 61 for effecting delay treatment of the image data from the second television camera 1, a selector 37, a second delay circuit 62 disposed between the selector 37 and a scanning converter 36, the scanning converter 36, a D/A converter 38, a data operator 39, a graphic circuit 40, a video encoder 41 and a synchronous signal generator 42.

Figure 28:
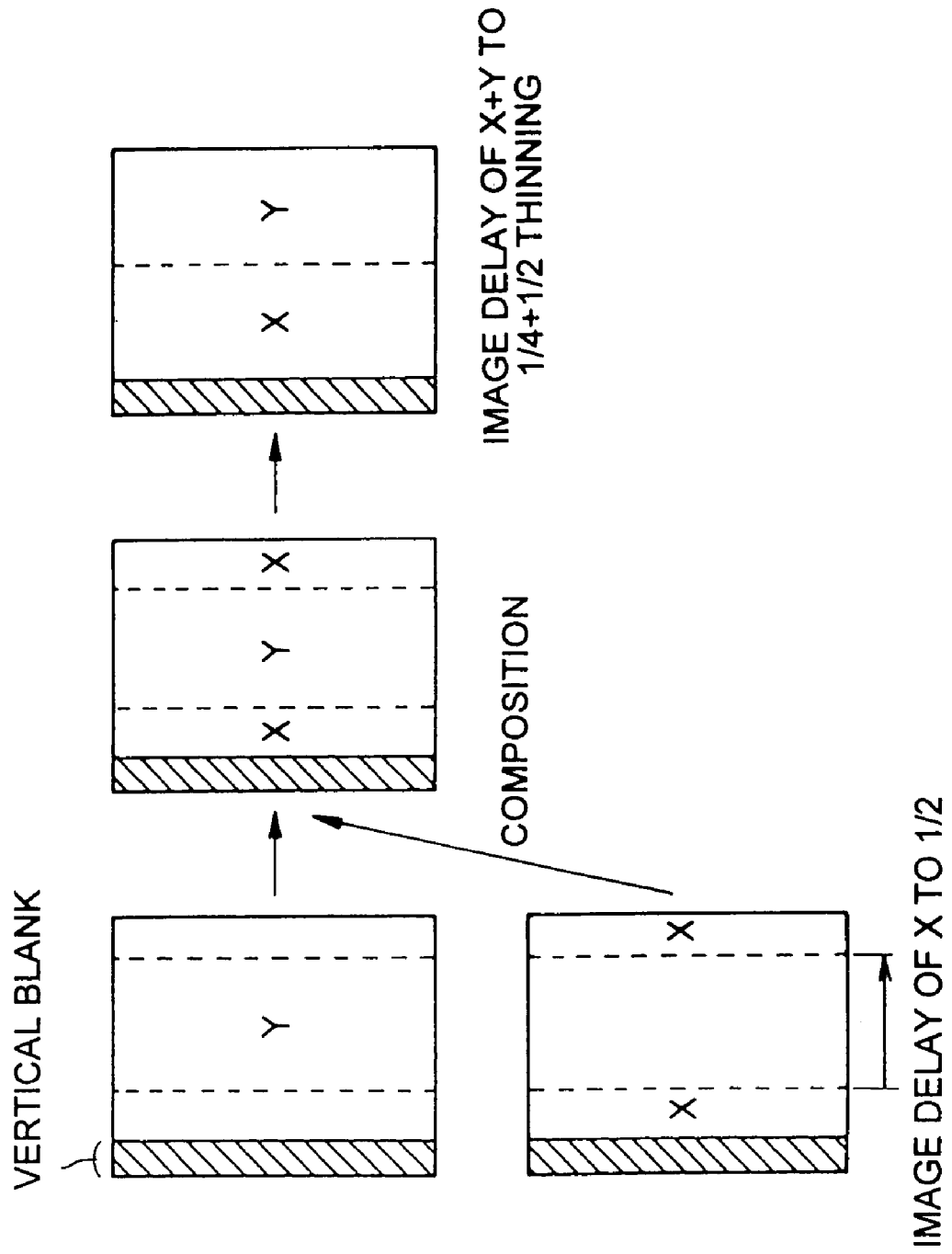
FIG. 28 is an explanatory view showing an example of picture plane composition utilizing a delay circuit.
Figure 29:
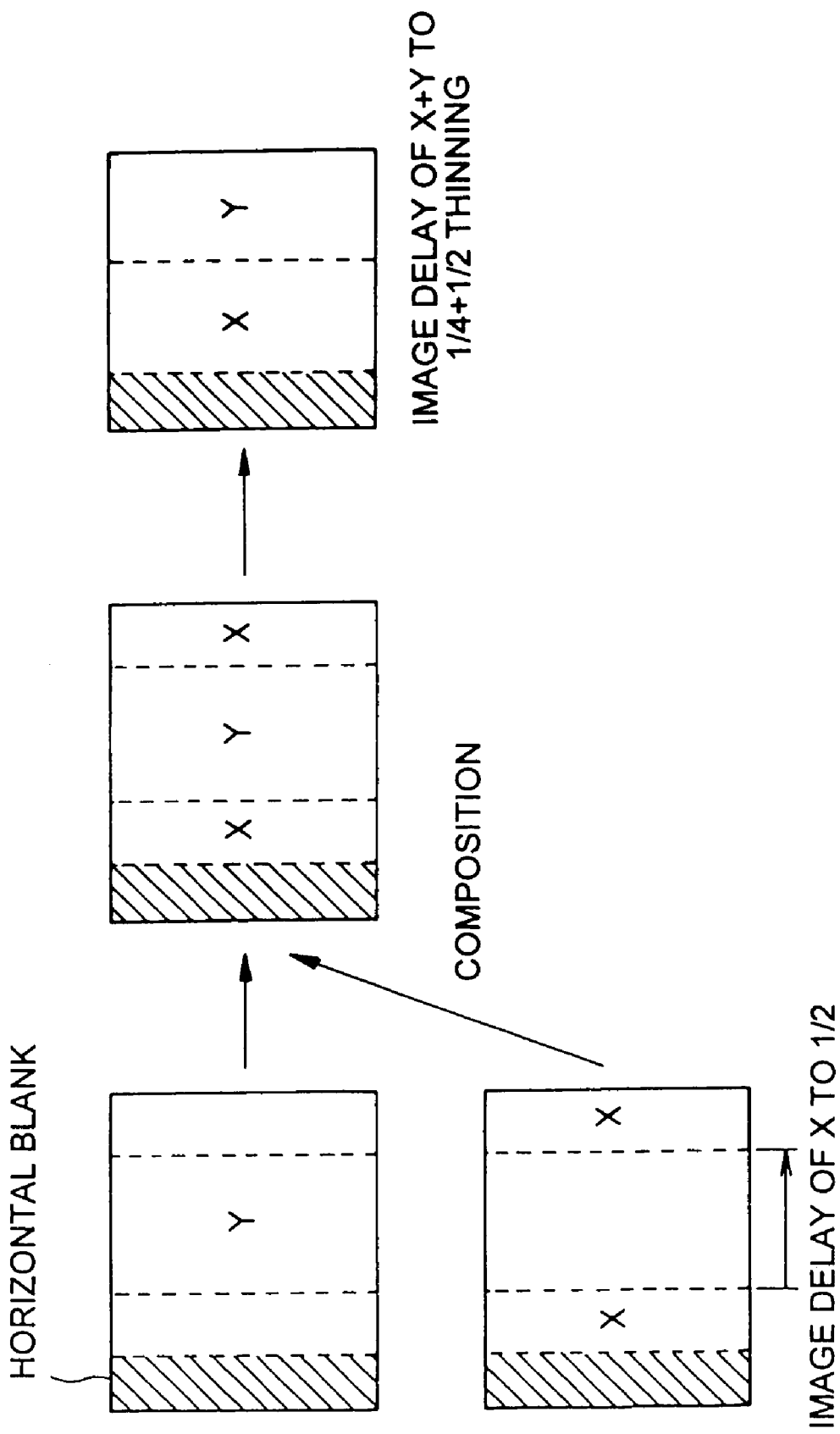
FIG. 29 is an explanatory view showing another example of picture plane composition utilizing a delay circuit, when a horizontal direction and a vertical direction of a television camera is replaced.
Figure 30:
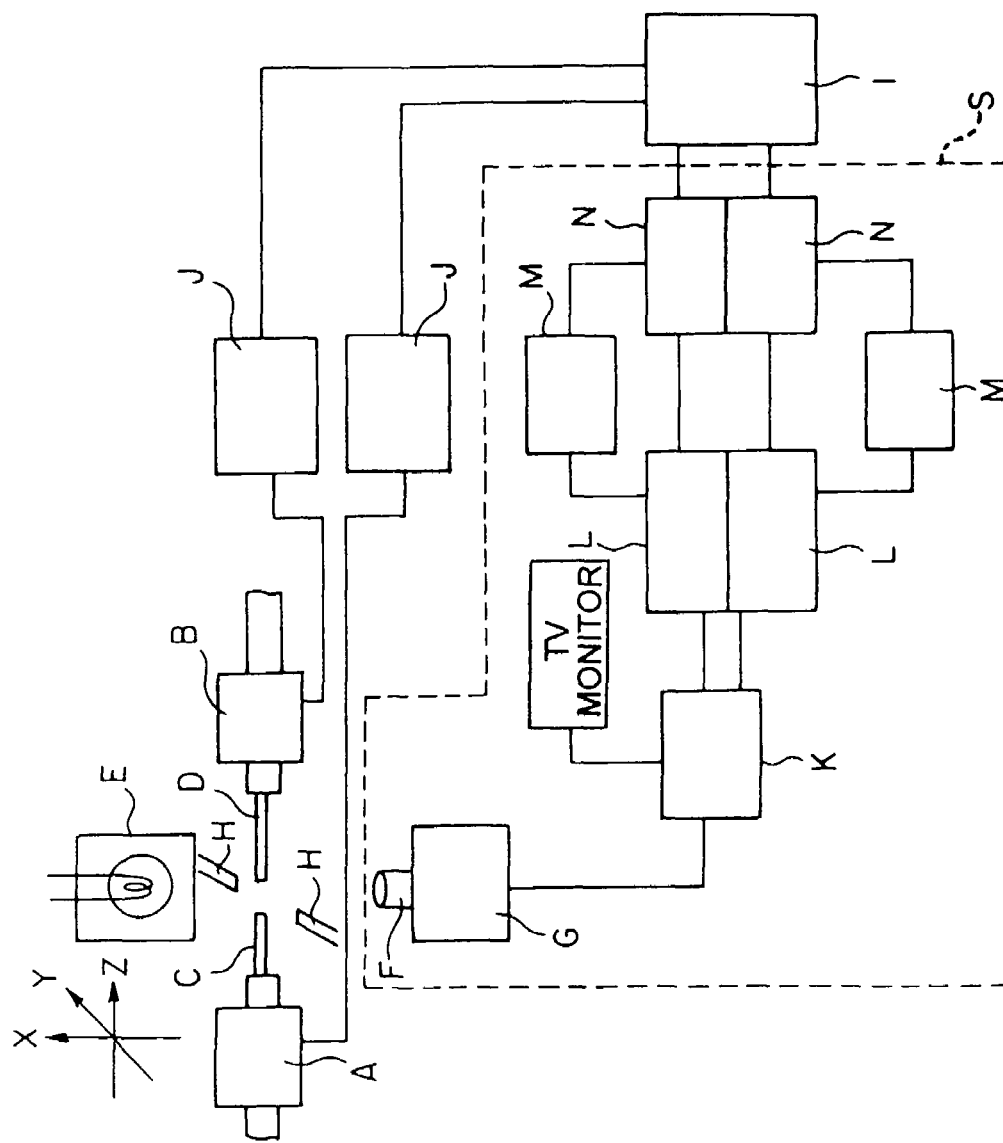
FIG. 30 is a schematic view showing an example of a conventional optical fiber fusion-splicer.
Figure 31A:
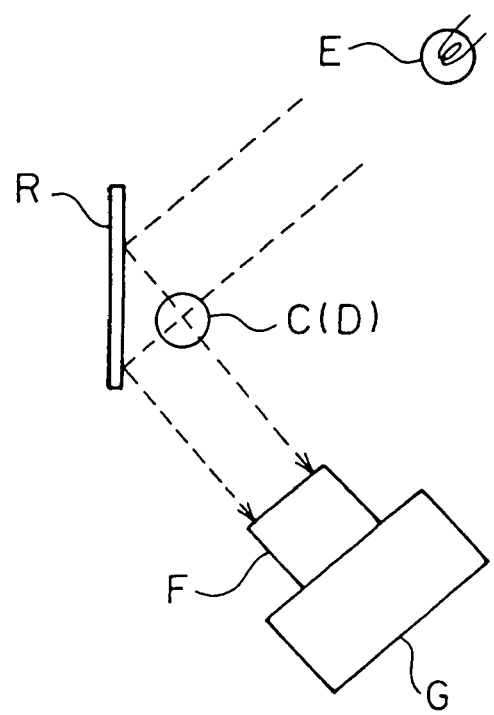
FIG. 31A is an explanatory view for explaining a case where photo-taking is effected by a single camera from two directions.
Figure 31B:
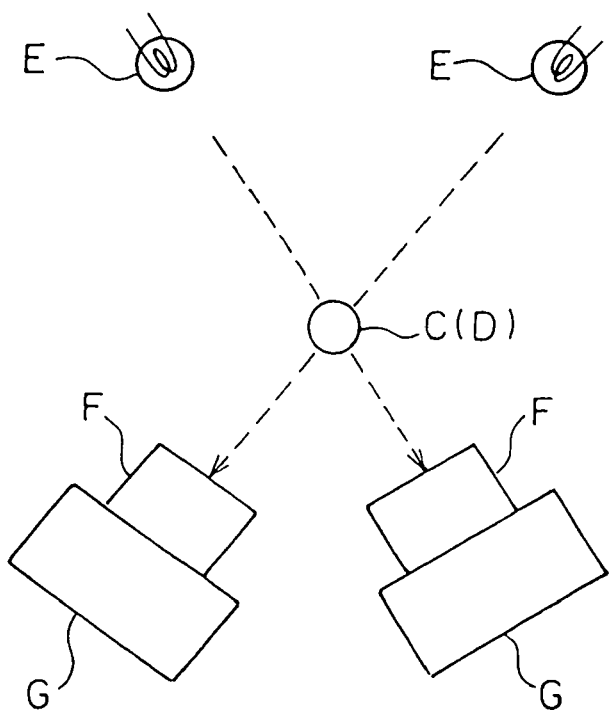
FIG. 31B is an explanatory view for explaining a case where photo-taking is effected by two cameras.
Figure 32A:
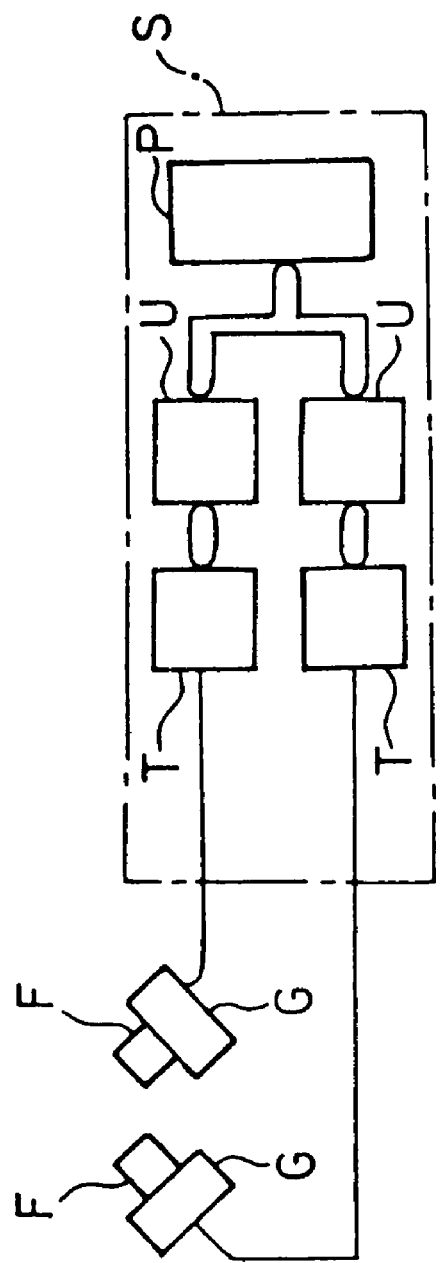
FIG. 32A is a schematic view of an image processing apparatus in which image capturing systems are provided for respective cameras.
Figure 32B:
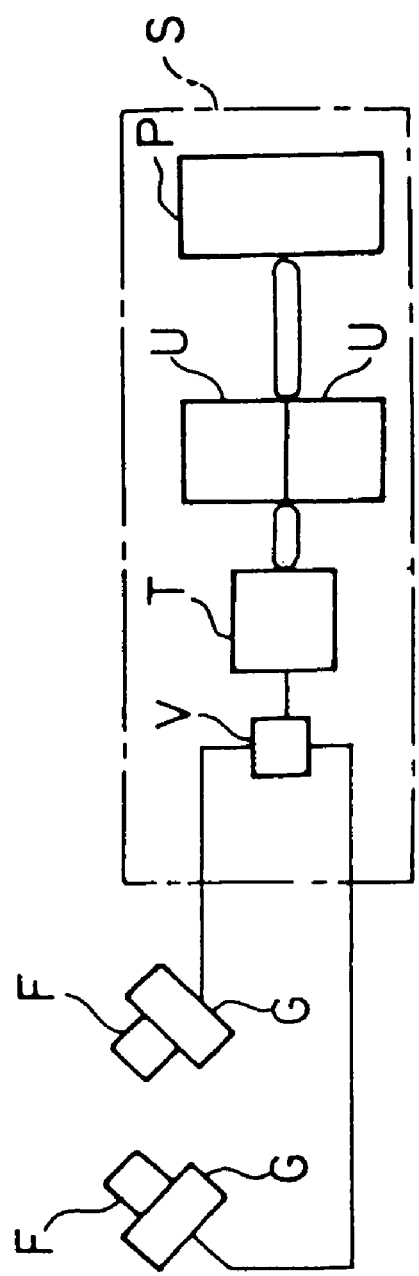
FIG. 32B is a schematic view of an image processing apparatus in which images from two cameras are captured by a single image capturing system.

Each of the first and second delay circuits 61, 62 can set a delay time from zero frame to one frame so that, by properly setting the delay times, images as shown in FIGS. 28 and 29 can be composed. These images are obtained by displaying the images from two television cameras 1 on left and right half parts of the television monitor, and a difference between FIG. 28 and FIG. 29 is that the television cameras 1 are installed vertically and are laid laterally. In both cases, the image from the second television camera is delayed by an amount corresponding to ½ picture plane by the first delay circuit 61, and the image composed by the selector 37 is delayed by an amount corresponding to ¼ picture plane by the second delay circuit 62, and the image data is thinned to ½ between the second delay circuit 62 and the scanning converter 36, with the result that the images from the first and second television cameras can be displayed side by side in the left-and-right direction.

The present invention can be applied to the following optical fiber observing image processing apparatuses:

1. The television cameras 1 may be of PAL type or SECAM type, as well as NTSC type.

2. Although the capturing mode shown in FIG. 7 is limited to the interlaced system, the capturing mode ③ and capturing mode ⑤ can be used in the non-interlaced system.

3. The number of the television cameras is not limited to two, but may be three, four or more.

4. The number of accesses to the data memory may be three or more for each pixel.

5. The optical fiber observing image processing apparatus according to the present invention can be constituted by using a digital signal processor (DSP) and software program.

6. The transferring of the image data between the data memory 35 shown in FIG. 15 or 16 and the scanning converter 36 may be synchronous with an input video signal of the television camera 1 or an output video signal to the television monitor or both or may not be synchronized, so long as the renewal of the picture plane can be achieved.

7. The scanning converter 30 shown in FIG. 14 may adjust the longitudinal magnification, lateral magnification, longitudinal offset amount, lateral offset amount and rotational amount of the inputted image.

8. Regarding the installation of the television cameras 1, orientation of the scanning lines may be in parallel or perpendicular to the axes of the optical fibers 2, 3.

INDUSTRIAL AVAILABILITY

According to the optical fiber observing image processing apparatus of the present invention, the following advantages can be obtained:

1. Since the optical fibers can be photo-taken from plural directions by using two television cameras, high accurate image processing can be achieved and high accurate positioning can be made.

2. The image processing can be performed by switching a plurality of different capturing modes provided in the image capturing means. For example, by effecting the image processing by switching a capturing mode having a high resolving power and a capturing mode having a low resolving power and high speed processing ability, a processing speed of the entire fusion-splicing process can be increased.

3. Since the plurality of different capturing modes can be switched, even when a single system for the image capturing circuit is used, the desired image processing performance can be achieved, thereby making the image processing apparatus cheaper and more compact.

4. Since the plurality of capturing modes including the capturing mode for switching the television cameras from frame to frame, the capturing mode for switching the television cameras from field to field and the capturing mode for switching the television cameras from pixel to pixel are provided and such capturing modes can be switched, even in optical fiber fusion-splice having a plurality of processing steps, by selecting the proper capturing mode, the processing can be effected with high accuracy at a high speed.

5. By utilizing the capturing mode in which the single field is divided into two or more and the desired television cameras are assigned to the respective divided fields to capture the image data from the plural television cameras into one field in a multiplex form, the image from the plural television cameras can be captured into a field for one picture plane in a multiplex form.

6. By utilizing the capturing mode in which the single scanning line is divided into two or more and the desired television cameras are assigned to the respective divided scanning lines to capture the image data from the plural television cameras on one scanning line in a multiplex form, the image from the plural television cameras can be captured into a field for one picture plane in a multiplex form.

7. Since the image data captured by the image capturing means can be outputted to the television monitor through the scanning converting means, the picture plane can be displayed on the television monitor with required treatment such as enlargement, contraction, offset or rotation of the picture plane.

8. Since at least two transfer modes for transferring the image data between the image capturing means and the scanning converting means are provided, in each step of the optical fiber fusion-splice, the transfer mode suitable for the step can be selected. Accordingly, the proper image processing can be effected by using the proper displayed picture plane, thereby providing high speed processing, high accuracy and good visibility.

9. By providing the plurality of modes for transferring the data between the image capturing means and the scanning converting means, since the data memory used in the image capturing means and the image processing controller used in the scanning converter can easily be obtained from the market, conventional LSI and gate array are available, thereby making the apparatus more compact and cheaper and saving an electric power.

10. By providing the delay means capable of setting the desired delay time for the image data, enlargement, contraction or offset of the image can be effected without the scanning converter.

What is claimed is:

1. An optical fiber fusion-splicer in which optical fibers to be fusion-spliced are photo-taken by at least two television cameras from plural directions, and image data of the optical fibers is captured into an image processing apparatus and processed, whereby each of operation steps ranging from positioning of optical axes and end faces of optical fibers to fusion-splicing is automatically carried out, wherein, said image processing apparatus comprises an image capturing means capable of capturing image data from the at least two television cameras by at least one input processing circuit and capable of capturing and image-processing only desired image data from each of said at least two television cameras;

the capturing modes of said image capturing means provided with said at least one input processing circuit include three capturing modes consisting of:

a capturing mode in which the image data can be captured from said at least two television cameras from frame to frame and the image data from said at least two television cameras can be captured by successively switching said at least two television cameras from frame to frame, a capturing mode in which the image data can be captured from said at least two television cameras from field to field and the image data from said at least two television cameras can be captured by successively switching said at least two television cameras from field to field, and a capturing mode in which the image data can be captured from said at least two television cameras from pixel to pixel and the image data from said at least two television cameras can be captured by successively switching said at least two television cameras from pixel to pixel, and at least two of said three capturing modes can be switched according to each step of fusion operation to capture the image data, the image captured by the selected capturing modes is displayed on a television monitor for observation, positioning members on which optical fibers are set are driven by a driving device on the basis of the captured image data so that positioning of optical axes and end faces of the optical fibers is made, and each of the operation steps up to fusion-splicing of the optical fibers by discharging of electrode rods is automatically carried out.

2. The optical fiber fusion-splicer according to claim 1, wherein the capturing means has a capturing mode in which a field of respective television camera is divided into two or more so that the desired television camera is assigned to the respective divided field to capture the image data of the plural television cameras into one field in a multiplexing form.

3. The optical fiber fusion-splicer according to claim 1, wherein said capturing means has a capturing mode in which one scanning line of the respective television camera is divided into two or more so that the desired television camera is assigned to the respective divided scanning line to capture the image data of the plural television cameras onto one scanning line in a multiplexing form.

* * * * *